(12) United States Patent
Sigler et al.

(10) Patent No.: US 10,857,618 B2
(45) Date of Patent: Dec. 8, 2020

(54) IMPROVING MECHANICAL PERFORMANCE OF AL-STEEL WELD JOINTS BY LIMITING STEEL SHEET DEFORMATION

(71) Applicant: GM GLOBAL TECHNOLOGY OPERATIONS LLC, Detroit, MI (US)

(72) Inventors: David R. Sigler, Shelby Township, MI (US); Amberlee S. Haselhuhn, Troy, MI (US); Blair E. Carlson, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 447 days.

(21) Appl. No.: 15/907,996

(22) Filed: Feb. 28, 2018

(65) Prior Publication Data
US 2019/0262930 A1 Aug. 29, 2019

(51) Int. Cl.
| | | |
|---|---|---|
| *B23K 11/11* | (2006.01) | |
| *B23K 11/20* | (2006.01) | |
| *B23K 103/20* | (2006.01) | |

(52) U.S. Cl.
CPC ............ *B23K 11/115* (2013.01); *B23K 11/20* (2013.01); *B23K 2103/20* (2018.08)

(58) Field of Classification Search
CPC ....... B23K 11/11; B23K 11/20; B23K 11/115; B23K 11/16; B23K 11/185
(Continued)

(56) References Cited

U.S. PATENT DOCUMENTS

| | | |
|---|---|---|
| 5,302,797 A | 4/1994 | Yasuyama et al. |
| 5,304,769 A | 4/1994 | Ikegami et al. |
| (Continued) | | |

FOREIGN PATENT DOCUMENTS

| | | |
|---|---|---|
| CN | 1946506 | 4/2007 |
| CN | 102059439 | 5/2011 |
| (Continued) | | |

OTHER PUBLICATIONS

Wang et al., "Interface microstructure and weld strength of steel/aluminum alloy joints by resistance spot welding," Applied Mechanics and Materials, vols. 117-119 (2012) pp. 1895-1899.
(Continued)

*Primary Examiner* — David J Walczak
(74) *Attorney, Agent, or Firm* — Reising Ethington P.C.

(57) ABSTRACT

A method of resistance spot welding a workpiece stack-up that includes a steel workpiece and one or more aluminum workpieces involves locally stiffening the steel workpiece to resist steel workpiece deformation. The local stiffening of the steel workpiece is achieved by incorporating an electrode receiving wall into the steel workpiece along with one or more integral elevated portions of the steel workpiece that are disposed at least partially around the electrode receiving wall. The electrode receiving wall includes an electrode-contact surface and an opposed interface contact surface. During welding, a weld face of one welding electrode is pressed against the electrode-contact surface of the electrode receiving wall of the steel workpiece, and electric current is momentarily passed between that welding electrode and another welding electrode on the opposite side of the workpiece stack-up to form a weld joint that bonds to the interface contact surface of the electrode receiving wall.

18 Claims, 6 Drawing Sheets

(58) Field of Classification Search
USPC .................. 219/78.01, 80, 86.1, 86.23, 91.2
See application file for complete search history.

(56) References Cited

U.S. PATENT DOCUMENTS

| | | | |
|---|---|---|---|
| 5,783,794 | A | 7/1998 | Oikawa et al. |
| 6,037,559 | A | 3/2000 | Okabe et al. |
| 7,850,059 | B2 | 12/2010 | Kobayashi et al. |
| 7,935,908 | B2 | 5/2011 | Nakagawa et al. |
| 7,951,465 | B2 | 5/2011 | Urushihara et al. |
| 7,984,840 | B2 | 7/2011 | Kobayashi et al. |
| 8,020,749 | B2 | 9/2011 | Kobayashi et al. |
| 8,058,584 | B2 | 11/2011 | Miyamoto et al. |
| 8,487,206 | B2 | 7/2013 | Urushihara et al. |
| 8,502,105 | B2 | 8/2013 | Tanaka et al. |
| 9,676,065 | B2 | 6/2017 | Sigler et al. |
| 2005/0218121 | A1 | 10/2005 | Hayashi et al. |
| 2005/0247679 | A1 | 11/2005 | Wang |
| 2007/0212565 | A1 | 9/2007 | Urushihara et al. |
| 2009/0255908 | A1 | 10/2009 | Sigler et al. |
| 2011/0097594 | A1 | 4/2011 | Tanaka et al. |
| 2012/0021240 | A1 | 1/2012 | Urushihara et al. |
| 2013/0189023 | A1 | 7/2013 | Spinella |
| 2013/0263638 | A1 | 10/2013 | Gugel et al. |
| 2014/0305912 | A1 | 10/2014 | Taniguchi et al. |
| 2014/0360986 | A1 | 12/2014 | Sigler et al. |
| 2015/0053654 | A1 | 2/2015 | Sigler et al. |
| 2015/0053655 | A1 | 2/2015 | Sigler et al. |
| 2015/0083693 | A1 | 3/2015 | Schroth et al. |
| 2015/0096961 | A1 | 4/2015 | Carlson et al. |
| 2015/0096962 | A1 | 4/2015 | Sigler et al. |
| 2015/0231729 | A1 | 8/2015 | Yang et al. |
| 2015/0231730 | A1 | 8/2015 | Sigler et al. |
| 2015/0352658 | A1 | 12/2015 | Yang et al. |
| 2015/0352659 | A1 | 12/2015 | Sigler et al. |
| 2016/0016252 | A1 | 1/2016 | Edwards, II |
| 2016/0158874 | A1 | 6/2016 | Wang et al. |
| 2016/0167158 | A1* | 6/2016 | Spinella .................. B23K 11/18 403/270 |
| 2016/0279732 | A1 | 9/2016 | Sigler et al. |
| 2016/0288242 | A1 | 10/2016 | Sigler et al. |
| 2016/0346865 | A1 | 12/2016 | Sigler et al. |
| 2017/0008118 | A1 | 1/2017 | Yang et al. |
| 2017/0106466 | A1 | 4/2017 | Sigler et al. |
| 2017/0157697 | A1 | 6/2017 | Yang et al. |
| 2017/0225262 | A1 | 8/2017 | Sigler et al. |
| 2017/0225263 | A1 | 8/2017 | Sigler et al. |
| 2017/0232548 | A1 | 8/2017 | Carlson et al. |
| 2017/0252853 | A1 | 9/2017 | Wang et al. |
| 2017/0282303 | A1 | 10/2017 | Wang et al. |
| 2017/0291246 | A1 | 10/2017 | Sigler et al. |
| 2017/0291247 | A1 | 10/2017 | Sigler et al. |
| 2017/0291248 | A1 | 10/2017 | Sigler et al. |
| 2017/0297134 | A1 | 10/2017 | Sigler et al. |
| 2017/0297135 | A1 | 10/2017 | Sigler et al. |
| 2017/0297136 | A1 | 10/2017 | Brown et al. |
| 2017/0297137 | A1 | 10/2017 | Perry et al. |
| 2017/0297138 | A1 | 10/2017 | Sigler et al. |
| 2017/0304925 | A1 | 10/2017 | Sigler et al. |
| 2017/0304928 | A1 | 10/2017 | Sigler et al. |
| 2017/0361392 | A1 | 12/2017 | Sigler et al. |
| 2019/0134735 | A1 | 5/2019 | Haselhuhn et al. |
| 2019/0240768 | A1* | 8/2019 | Furusako ............. B23K 11/255 |
| 2019/0262930 | A1 | 8/2019 | Sigler et al. |
| 2019/0283168 | A1 | 9/2019 | Sigler et al. |
| 2020/0055139 | A1* | 2/2020 | Wang ................. B23K 11/3009 |

FOREIGN PATENT DOCUMENTS

| | | |
|---|---|---|
| CN | 102114574 | 7/2011 |
| JP | 11342477 | 12/1999 |
| JP | 2011224578 | 11/2011 |
| JP | 2013151017 | 8/2013 |

OTHER PUBLICATIONS

Zhang et al., "Effects of resistance spot welding parameters on microstructures and mechanical properties of dissimilar material joints of galvanised high strength steel and aluminum alloy," Science and Technology of Welding Journal, vol. 16 (2011) No. 2 pp. 153-161.

Weihua et al., "Microstructure and mechanical property of resistance spot welded joint of aluminum alloy to high strength steel with especial electrodes," China Welding, vol. 20 (2011) No. 2 pp. 1-6.

Weihua et al., "Interfacial characterization of resistance spot welded joint of steel and aluminum alloy," China Welding, vol. 19 (2010) No. 4 pp. 6-10.

Zhang et al., "Characterization of Intermetallic Compounds in Dissimilar Material Resistance Spot Welded Joint of High Strength Steel and Aluminum Alloy," ISIJ International, vol. 51 (2011) No. 11 pp. 1870-1877.

Choi et al., "A Hybrid Joining Technology for Aluminum/Zinc Coated Steels in Vehicles," J. Mater. Sci. Technol., 2010, 26(9), pp. 858-864.

Hwang et al., "Dissimilar Metal Welding of Steel to Al—Mg Alloy by Spot Resistance Welding," Advanced Materials Research, vols. 15-17 (2007) pp. 381-386.

Imaizumi et al., "Joining Aluminum Automotive Body Alloys to Mild Steel by Resistance Spot Welding," Journal of the Japan Light Metal Welding and Construction Association, vol. 17 (1979) No. 1 pp. 10-17.

Miyamoto et al., "Dissimilar Joining of Aluminum Alloy and Steel by Resistance Spot Welding," SAE Int. J. Mater. Manuf., vol. 2 (2009) Issue 1 pp. 58-67.

Mortazavi et al., "Investigation on Joint Strength of Dissimilar Resistance Spot welds of Aluminum Alloy and Low Carbon Steel," Advanced Materials Research, vols. 264-265 (2011) pp. 384-389.

Qiu et al., "Resistance Spot Welding between Aluminum Alloy and Low-Carbon Steel," Advanced Materials Research, vols. 189-193 (2011) pp. 3534-3540.

Qui et al., "Interfacial microstructure and strength of steel/aluminum alloy joints welded by resistance spot welding with cover plate," Journal of Materials Processing Technology, 209 (2009) pp. 4186-4193.

Ueda et al., "Effects of Zn-Based Alloys Coating on Mechanical Properties and Interfacial Microstructures of Steel/Aluminum Alloy Dissimilar Metals Joints Using Resistance Spot Welding," Materials Transactions, vol. 52 (2011) No. 5 pp. 967-973.

English translation of CN 102059439 to Mazda Motor (published May 18, 2011).

English translation JP 2011224578 to Kobe Steel (published Nov. 10, 2011).

English translation of JP2013151017 to Mazda Motor (published Aug. 8, 2013).

* cited by examiner

IMPROVING MECHANICAL PERFORMANCE OF AL-STEEL WELD JOINTS BY LIMITING STEEL SHEET DEFORMATION

INTRODUCTION

A number of industries utilize resistance spot welding to join together two or more metal workpieces during the manufacture of a larger assembly. The automotive industry, for example, often uses resistance spot welding to join together metal workpieces during the manufacture of structural frame members (e.g., body sides and cross members) for a vehicle body-in-white (BIW) as well as vehicle closure members (e.g. vehicle doors, hoods, trunk lid, and lift-gates) that are mounted to the BIW, among others. Resistance spot welding has long been employed to fusion weld together similarly-composed metal workpieces such as a stack-up of two or more steel workpieces or two or more aluminum workpieces. More recently, however, resistance spot welding practices have been developed that enable dissimilar metal workpieces such as a steel workpiece and an overlapping an aluminum or aluminum alloy workpiece to be bonded together. The ability to resistance spot weld such stack-ups of dissimilar metal workpieces as they are presented for welding provides the automobile industry with more flexibility to utilize both ferrous and non-ferrous metal within the vehicle structure at specifically tailored locations without significantly increasing overall manufacturing complexity. Other industries besides the automotive industry may also benefit from the ability to reliably resistance spot weld workpiece stack-ups that include dissimilar metal workpieces. These other industries may include the aerospace, marine, railway, building construction, and industrial equipment industries, to name but a few.

Resistance spot welding is a metal joining process that relies on the momentary passage of an electric current through overlapping metal workpieces to heat and join the workpieces at a weld location. To carry out such a welding process, two opposed welding electrodes are clamped at aligned spots on opposite sides of the overlapping workpieces and an electric current is passed through the metal workpieces between the opposed weld faces of the two electrodes. Resistance to the flow of this electric current generates heat within the metal workpieces and at their faying interface. The resistively-generated heat is rapidly created and sufficiently concentrated enough to melt one or more of the overlapping metal workpieces. When the workpiece stack-up includes a steel workpiece and an adjacent overlapping aluminum workpiece, for example, the heat generated at the faying interface and within the more electrically and thermally resistive steel workpiece creates a molten aluminum weld pool within the aluminum workpiece. The aluminum weld pool does not consume the faying interface between the steel and aluminum workpieces, but, rather, spreads and wets the adjacent faying surface of the steel workpiece. Eventually, upon cooling, the molten aluminum weld pool solidifies into weld joint that interfacially bonds or brazes the steel and aluminum workpieces together at their faying interface.

In practice, however, resistance spot welding a stack-up that includes at least a steel workpiece and an adjacent overlapping aluminum workpiece is challenging since a number of characteristics of those two metals can adversely affect the performance—most notably tearing down coupons or parts as well as mechanical tests in peel and/or cross-tension strength—of the weld joint. For one, the aluminum workpiece usually contains a mechanically tough, electrically insulating, and self-healing refractory oxide surface layer. This oxide surface layer is typically comprised of aluminum oxide compounds, but may include other metal oxide compounds as well, including those of magnesium oxide when the aluminum workpiece is composed, for example, of a magnesium-containing aluminum alloy. As a result of its properties, the refractory oxide surface layer has a tendency to remain intact at the faying interface where it not only hinders the ability of the molten aluminum weld pool to wet the steel workpiece, but also provides a source of near-interface defects within the growing aluminum weld pool. Furthermore, the insulating nature of the refractory oxide surface layer raises the electrical contact resistance of the aluminum workpiece—namely, at its faying surface and at its electrode contact point—making it difficult to effectively control and concentrate heat within the aluminum workpiece.

Apart from the challenges presented by the refractory oxide surface layer of the aluminum workpiece, the steel workpiece and the aluminum workpiece possess different physical properties that can adversely affect the strength and properties of the weld joint. Specifically, aluminum has a relatively low melting point (570° C.-600° C.) and relatively low electrical and thermal resistivities, while steel has a relatively high melting point (1300° C.-1500° C.) and relatively high electrical and thermal resistivities. As a consequence of these differences in material properties, the majority of the heat is generated within the steel workpiece during current flow such that a heat imbalance exists between the steel workpiece (higher temperature) and the aluminum workpiece (lower temperature). The combination of the heat imbalance created during current flow and the high thermal conductivity of the aluminum workpiece means that, immediately after the electric current flow is terminated, a situation occurs where heat is not disseminated symmetrically from the weld zone. Instead, heat is conducted from the hotter steel workpiece through the aluminum workpiece towards the welding electrode in contact with the aluminum workpiece, which creates a steep thermal gradient in that direction.

The development of a steep thermal gradient between the steel workpiece and the welding electrode in contact with the aluminum workpiece is believed to weaken the resultant weld joint in several ways. First, because the steel workpiece retains heat for a longer duration than the aluminum workpiece after the flow of electric current has terminated, the molten aluminum weld pool solidifies directionally, starting from the region proximate the colder welding electrode (often water cooled) in contact with the aluminum workpiece and propagating towards the faying surface of the steel workpiece. A solidification front of this kind tends to sweep or drive defects—such as gas porosity, shrinkage voids, and micro-cracking—towards and along the bonding interface of the weld joint and the steel workpiece where residual oxide film defects are already present. The residual oxide film defects can be particularly disruptive if combined with thermal decomposition residuals from either an adhesive layer or other organic material layer that may be present between the aluminum and steel workpieces. Second, the sustained elevated temperature in the steel workpiece promotes the growth of a hard and brittle Fe—Al intermetallic layer within the weld joint and contiguous with the faying surface of the steel workpiece. Having a dispersion of weld defects together with excessive growth of the Fe—Al intermetallic layer at the bonding interface tends to reduce joint strength, particularly the peel and cross-tension strength of the weld joint.

Even if techniques and other measures are implemented to mitigate the potentially adverse effects attributable to the refractory oxide surface layer of the aluminum workpiece(s) and the materially different physical properties of the aluminum and steel workpieces, the strength and other mechanical properties of the weld joint may still be unsatisfactory in certain circumstances. Notably, if the steel workpiece(s) in the stack-up is relatively thin and has a low yield strength or can otherwise be easily strained relative to the aluminum workpiece(s) when the weld joint is subjected to loading, the early onset and/or the excessive rate of deformation induced in the steel workpiece(s), whether elastic or plastic, can stress the joint and fracture the Fe—Al intermetallic layer. This results in interfacial failure of the joint and, consequently, causes the joint to exhibit lower-than-expected strength, especially in both peel and cross-tension tests, despite the fact that the joint is otherwise structurally sound. While the exact type of steel workpieces that may experience the type of excessive strain that leads to interfacial failure can vary depending on the composition, thickness, and properties (e.g., yield strength) of the aluminum workpiece(s), oftentimes the problem is encountered when the steel workpiece(s) are low strength steels or thin-gauge high strength steels.

In light of the aforementioned challenges, mechanical fasteners such as self-piercing rivets and flow-drill screws have predominantly been used to fasten steel and aluminum workpieces together in lieu of resistance spot welding. Mechanical fasteners, however, take longer to put in place and have high consumable costs compared to spot welding, and further require their own dedicated equipment that must be installed and integrated into a manufacturing setting that may not be needed if existing spot welding equipment could be used instead. Mechanical fasteners also add weight to the vehicle structure—weight that is avoided when joining is accomplished by way of an autogenous joint spot welding—that offsets some of the weight savings attained through the use of an aluminum workpiece in the first place. Consequently, resistance spot welding practices that support the creation of a robust weld joint with reliable mechanical properties when resistance spot welding steel to aluminum—particularly when there is a noteworthy disparity between the stiffness of the steel workpiece(s) and the adjacent aluminum workpiece(s) of the stack-up—are still needed.

SUMMARY

An embodiment of a method of resistance spot welding a workpiece stack-up that includes a steel workpiece and at least one adjacent overlapping aluminum workpiece includes several steps. In one step, an electrode receiving wall is formed in a steel workpiece. The electrode receiving wall has an electrode-contact surface and an opposed interface contact surface, and the electrode-contact surface is at least partially defined by one or more integral elevated portions of the steel workpiece that protrude upwardly from the electrode-contact surface. In another step, the steel workpiece and one or more aluminum workpieces are assembled in overlapping fashion to form a workpiece stack-up such that the interface contact surface of the electrode receiving wall of the steel workpiece confronts and makes contact with an adjacent faying surface of the one or more aluminum workpieces to establish a faying interface. In still another step, a first weld face of a first welding electrode is pressed against the electrode contact surface of the electrode receiving wall of the steel workpiece at a first side of the workpiece stack-up, and a second weld face of a second welding electrode is pressed against an exposed back surface of the one or more aluminum workpiece at a second side of the workpiece stack-up in facial alignment with the first weld face of the first welding electrode. In yet another step, an electric current is passed between the first weld face of the first welding electrode and the second weld face of the second welding electrode to create a molten aluminum weld pool within the one or more aluminum workpieces that wets the interface contact surface of the electrode receiving wall of the steel workpieces. And, in still another step, the molten aluminum weld pool is allowed to solidify into a weld joint that bonds the one or more aluminum workpieces to the steel workpiece.

The method of the aforementioned embodiment may include additional steps or be further defined. For example, each of the one or more integral elevated portions of the steel workpiece that at least partially defines the electrode-contact surface of the electrode receiving wall is raised at least 0.5 mm above the electrode-contact surface. In another example, a segment of a faying surface of the steel workpiece underneath the one or more integral elevated portions of the steel workpiece confronts, but does not contact, the adjacent faying surface of the one or more aluminum workpieces, thereby defining a gap in combination with the adjacent faying surface of the one or more aluminum workpieces that at least partially surrounds the electrode receiving wall of the steel workpiece. Furthermore, the electrode-contact surface of the electrode receiving wall may be fully enclosed by the one or more integrated elevated portions of the steel workpiece, or it may be partially enclosed by the one or more integrated elevated portions of the steel workpiece.

The electrode receiving wall of the aforementioned embodiment may be constructed in numerous ways. In one implementation, the electrode receiving wall is a round castellation in which the electrode-contact surface is round or ovular in plan view and is at least partially circumscribed by an inclined wall that extends outwardly from the electrode-contact surface at an obtuse angle ranging from 95° to 150°. In another implementation, the electrode receiving wall is a linear castellation in which the electrode-contact surface is rectangular in plan view and is defined at least partially by a pair of lateral integral elevated portions of the steel workpiece, with each of the lateral integral elevated portions of the steel workpiece having an inclined wall that extends outwardly from the electrode-contact surface at an obtuse angle ranging from 95° to 150°. In still another implementation, the electrode receiving wall is a portion of the steel workpiece located between two spaced apart strengthening ribs, with each of the strengthening ribs including an arcuate wall having an outer surface that protrudes outwardly from the electrode-contact surface and an outboard portion of a back surface of the steel workpiece outside of the electrode receiving wall.

The electrode receiving wall may be incorporated into a wide variety of steel workpieces as part of the aforementioned embodiment. For example, the steel workpiece may have a thickness of 2.5 mm or less and a yield strength of 250 MPa or less, or the steel workpiece may have a thickness of 1.8 mm or more and a yield strength of 500 MPa or less. In another example, the steel workpiece may have a thickness of 1.3 mm or less and a yield strength of 1000 MPa or less, or the steel workpiece may have a thickness of 0.6 mm or less and a yield strength of 1000 MPa or less.

Another embodiment of a method of resistance spot welding a workpiece stack-up that includes a steel workpiece and at least one adjacent overlapping aluminum workpiece includes several steps. In one step, a workpiece stack-up is provided. The workpiece stack-up includes a steel workpiece which overlaps one or more aluminum workpieces at a spot weld location. The steel workpiece comprises an electrode receiving wall having an electrode-contact surface and an opposed interface contact surface. The electrode-contact surface is at least partially defined by one or more integral elevated portions of the steel workpiece that protrude outwardly from the electrode-contact surface, and the interface contact surface of the electrode receiving wall of the steel workpiece confronts and makes contact with an adjacent faying surface of the one or more aluminum workpieces to establish a faying interface. At least some part of the one or more integral elevated portions of the steel workpiece are located within a planar circular region that extends in a plane of the electrode-contact surface and has a radius of 5 mm to 50 mm as measured from a center of the spot weld locations. Moreover, anywhere from 90° to 360° of a circumference of the planar circular region is spanned by the one or more integral elevated portions of the steel workpiece.

In another step of the method, a first weld face of a first welding electrode is pressed against the electrode-contact surface of the electrode receiving wall of the steel workpiece at a first side of the workpiece stack-up, and a second weld face of a second welding electrode is pressed against an exposed back surface of the one or more aluminum workpiece at a second side of the workpiece stack-up in facial alignment with the first weld face of the first welding electrode. In still another step, an electric current is passed between the first weld face of the first welding electrode and the second weld face of the second welding electrode to create a molten aluminum weld pool within the one or more aluminum workpieces that wets the interface contact surface of the electrode receiving wall of the steel workpieces. And, in yet another step, the molten aluminum weld pool is allowed to solidify into a weld joint that bonds the one or more aluminum workpieces to the steel workpiece. The weld joint extends into the one or more aluminum workpieces included in the workpiece stack-up and establishes a bonding interface with the interface contact surface of the electrode receiving wall of the steel workpiece. Additionally, the weld joint includes an aluminum weld nugget and a Fe—Al intermetallic layer between the aluminum weld nugget and the interface contact surface of the electrode receiving wall of the steel workpiece.

The method of the aforementioned embodiment may include additional steps or be further defined. For example, the step of providing the workpiece stack-up may include forming the electrode receiving wall and the one or more integral elevated portions that are disposed at least partially around the electrode receiving wall in the steel workpiece, and assembling the steel workpiece and the one or more aluminum workpieces in overlapping fashion to form the workpiece stack-up such that the interface contact surface of the electrode receiving wall of the steel workpiece confronts and makes contact with the adjacent faying surface of the one or more aluminum workpieces to establish the faying interface. In another example, the step of forming the electrode receiving wall in the steel workpiece may include stamping the electrode receiving wall to form (1) a round castellation in which the electrode-contact surface is round or ovular in plan view and is at least partially circumscribed by an inclined wall that extends outwardly from the electrode-contact surface at an obtuse angle, or (2) a linear castellation in which the electrode-contact surface is rectangular in plan view and is defined at least partially by a pair of lateral integral elevated portions of the steel workpiece, with each of the lateral integral elevated portions of the steel workpiece having an inclined wall that extends outwardly from the electrode-contact surface at an obtuse angle.

The electrode receiving wall of the aforementioned embodiment may be constructed in numerous ways. For instance, the electrode-contact surface of the electrode receiving wall is fully enclosed by the one or more integrated elevated portions of the steel workpiece, or the electrode-contact surface of the electrode receiving wall is partially enclosed by the one or more integrated elevated portions of the steel workpiece. Additionally, a segment of a faying surface of the steel workpiece underneath the one or more integral elevated portions of the steel workpiece confronts, but does not contact, the adjacent faying surface of the one or more aluminum workpieces, thereby defining a gap in combination with the adjacent faying surface of the one or more aluminum workpieces that at least partially surrounds the electrode receiving wall of the steel workpiece.

The electrode receiving wall may be incorporated into a wide variety of steel workpieces as part of the aforementioned embodiment. For example, the steel workpiece may have a thickness of 2.5 mm or less and a yield strength of 250 MPa or less, or the steel workpiece may have a thickness of 1.8 mm or more and a yield strength of 500 MPa or less. In another example, the steel workpiece may have a thickness of 1.3 mm or less and a yield strength of 1000 MPa or less, or the steel workpiece may have a thickness of 0.6 mm or less and a yield strength of 1000 MPa or less.

DETAILED DESCRIPTION

Figure 1:
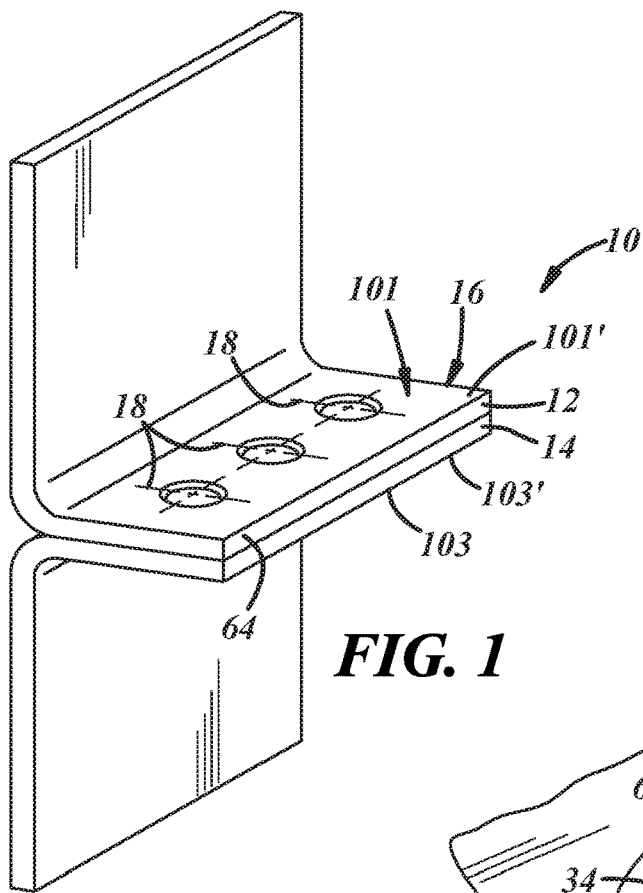
FIG. 1 is an elevated perspective view of a workpiece stack-up in the form of a flange assembly in preparation for resistance spot welding, wherein the workpiece stack-up includes at least a steel workpiece and an adjacent overlapping aluminum workpiece.

The ability to obtain satisfactory mechanical performance in a resistance spot weld formed in a workpiece stack-up that includes at least a steel workpiece and an aluminum workpiece can be improved by locally stiffening the steel workpiece included in the stack-up whenever there is a risk that, under loading, the steel workpiece may undergo early and excessive deformation relative to the aluminum workpiece(s) when the weld joint formed between the adjacent steel and aluminum workpieces. The localized stiffening of the steel workpiece(s) may be achieved by incorporating integral, out-of-plane variations into the steel workpiece geometry to provide an electrode receiving wall sized to accommodate pressed contact with a welding electrode. The electrode receiving wall includes an electrode-contact surface and an interface contact surface, and the out-of-plane steel workpiece variations include one or more integral elevated portions of the steel workpiece that protrude upwardly from, and at least partially define, the electrode-contact surface. The one or more integral elevated portions of the steel workpiece may entirely enclose the electrode-contact surface, or the one or more integral elevated portions may only partially enclose the electrode-contact surface including, for example, when the electrode-contact surface extends to and terminates at a free edge of the steel workpiece. The localized stiffening of the steel workpiece provided by the integral out-of-plane steel workpiece variations resists deformation in the steel workpiece in the region immediately surrounding the weld location. Similar out-of-plane steel workpiece variations may be present at each of a plurality of weld locations on the workpiece stack-up.

The steel workpiece may be locally stiffened in accordance with the present disclosure whenever it has been determined through experience, modeling, calculation, or other qualitative and/or quantitative measures that the steel workpiece would exhibit deformation earlier and/or at a faster rate than the aluminum workpiece(s) included in the stack-up when a weld joint formed between the workpieces is subjected to loading. The circumstances under which the steel workpiece may benefit from local stiffening depend on a confluence of factors including the strength and thickness of the steel workpiece as well as the strength, thickness, and number of the one or more aluminum workpieces disposed next to the steel workpiece in the stack-up. The same steel workpiece may benefit from local stiffening in certain circumstances but not others. In general, the use of the integral out-of-plane steel workpiece variations to provide local stiffening at a weld location becomes more impactful on the strength of the formed weld joint at that location—particularly the peel strength and cross-tension strength—as one or more of the yield strength of the steel workpiece decreases, the thickness of the steel workpiece decreases, or the number of aluminum workpieces in the stack-up increases.

A number of workpiece stack-up assemblies may be locally stiffened and resistance spot welded in accordance with the present disclosure. For example, a workpiece stack-up may include only a steel workpiece and an adjacent overlapping aluminum workpiece, as far as the number of workpieces are concerned, and an electrode receiving wall along with integral elevated portions of the steel workpiece in close proximity may be incorporated into the steel workpiece at each of one or more predetermined weld locations assigned to the stack-up. As another example, a workpiece stack-up may include a steel workpiece and more than one aluminum workpieces so long as the multiple aluminum workpieces are disposed next to each other. In this scenario, the workpiece stack-up may be a "3T" stack-up that includes a steel workpiece and two aluminum workpieces that lie adjacent to the steel workpieces (i.e., an aluminum-aluminum-steel stack-up), or the workpiece stack-up may be a "4T" stack-up that includes a steel workpiece and three aluminum workpieces that lie adjacent to the steel workpiece (i.e., an aluminum-aluminum-aluminum-steel stack-up). When more than one aluminum workpiece is present in the stack-up, the electrode receiving wall and the integral elevated portions of the steel workpiece may be incorporated into the steel workpiece at each of one or more predetermined weld locations assigned to the stack-up, as before.

Figure 2:
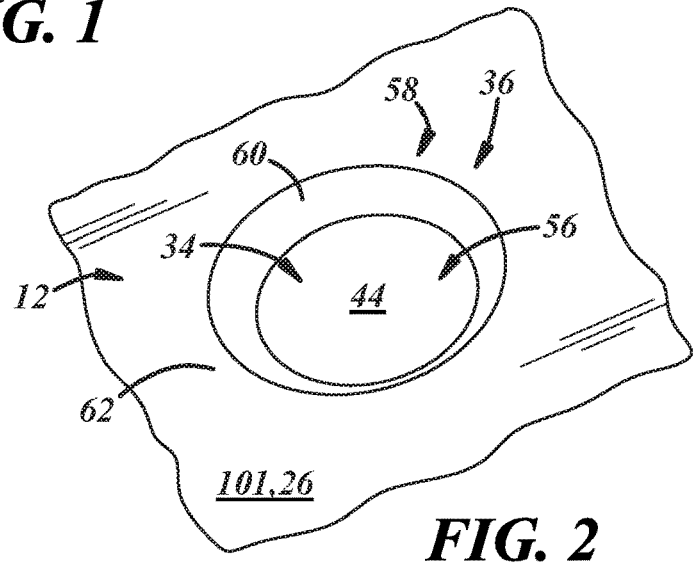
FIG. 2 is an elevated perspective view of the steel workpiece including, in particular, an above view of an embodiment of an electrode receiving wall formed at a weld location along with one or more integral elevated portions of the steel workpiece at least partially around the electrode receiving wall.
Figure 3:
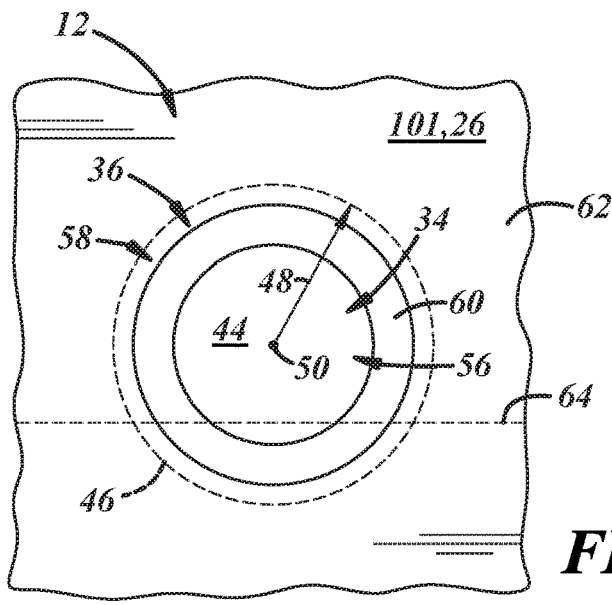
FIG. 3 is a plan view of the electrode receiving wall and the one or more integral elevated portions of the steel workpiece depicted in FIG. 2.

Referring now to FIGS. 1-4, one embodiment of a workpiece stack-up 10 that may be resistance spot welded in accordance with the present disclosure is illustrated. The workpiece stack-up includes a steel workpiece 12 and an adjacent overlapping aluminum workpiece 14. And, as shown best in FIG. 1, the workpiece stack-up 10 is in the form of a flange assembly 16 that includes a plurality of predetermined weld locations 18. The workpiece stack-up 10 has a first side 101 provided by a steel workpiece surface 101' and a second side 103 provided by an aluminum workpiece surface 103'. The two sides 101,103 of the workpiece stack-up 10 are accessible to the set of welding electrodes 20,22 (FIGS. 4-7), respectively, at each of the weld locations 18; that is, a first welding electrode 20 is arranged to make contact with and be pressed against the first side 101 of the workpiece stack-up 10 while a second welding electrode 22 is arranged to make contact with and be pressed against the second side 103. It should be noted that while only one weld location 18 is depicted in FIGS. 2-3, skilled artisans will appreciate that spot welding may be practiced with the first and second welding electrodes 20, 22 in the same way at each of the other weld locations 18 shown on the stack-up 10 in FIG. 1, if desired.

When the two workpieces 12, 14 are stacked-up for spot welding in the context of a "2T" stack-up embodiment, which is illustrated in FIGS. 1-4, the steel workpiece 12 and the aluminum workpiece 14 present the first and second sides 101, 103 of the workpiece stack-up 10, respectively. In particular, the steel workpiece 12 includes a faying surface 24 and an exposed back surface 26 and, likewise, the aluminum workpiece 14 includes a faying surface 28 and an exposed back surface 30. The faying surfaces 24, 28 of the two workpieces 12, 14 overlap and confront one another to establish a faying interface 32 that encompasses at least the weld location 18 and which may optionally encompass an intermediate organic material layer (not shown) applied between the faying surfaces 24, 28. The back surfaces 26, 30 of the steel and aluminum workpieces 12, 14, on the other hand, face away from one another in opposite directions at the weld location 18 and constitute, respectively, the steel workpiece surface 101' and the aluminum workpiece surface 103' of the first and second sides 101, 103 of the workpiece stack-up 10. The intermediate organic material layer that may be present between the faying surfaces 24, 26 of the steel and aluminum workpieces 12, 14 may be an adhesive, such as heat-curable epoxy or a heat-curable polyurethane, or it may be sealer. The inorganic material layer, if present, is typically applied to have a thickness at least within the weld location 18 that ranges from 0.1 mm to 2.0 mm or, more narrowly, from 0.2 mm to 1.0 mm, prior to spot welding.

The steel workpiece 12 includes an electrode receiving wall 34 at the weld location 18 along with one or more integral elevated portions 36 of the steel workpiece 12 at least partially around the electrode receiving wall 34. These structural features 34, 36 are designed to inhibit early and excessive strain in the steel workpiece 12 that might otherwise occur when a weld joint 38 (FIG. 8) formed between the steel and aluminum workpieces 12, 14 is subjected to loading. As shown best in FIGS. 4-5, the electrode receiving wall 34 includes an electrode-contact surface 40 and an interface contact surface 42 opposed to the electrode-contact surface 40. The electrode-contact surface 40, which is a section of the back surface 26 of the steel workpiece 12, is at least partially defined by the integral elevated portion(s) 36 of the steel workpiece 12 has a surface area 44 within the confines of the integral elevated portion(s) 36. This surface area 44 can accommodate the full weld face of a welding electrode but is not so large that the localized stiffening provided by the integral elevated portion(s) 36 of the steel workpiece 12 is divorced from the weld location 18. In a preferred embodiment, for instance, and to help ensure that the steel workpiece 12 is stiffened in close enough proximity to the weld location 18 by the one or more integral elevated portion(s) 36, at least some part of the one or more integral elevated portions 36 of the steel workpiece 12 is located within a planar circular region 46 that extends in the plane of the electrode-contact surface 40 and has a radius 48 of 5 mm to 50 mm, or more narrowly 8 mm to 25 mm, as measured from a center 50 of the weld location 18. Preferably, anywhere from 90° to 360°, and more narrowly anywhere from 120° to 360°, of a circumference of the planar circular region 46 is spanned by the integral elevated portion(s) 36 of the steel workpiece 12.

The interface contact surface 42 of the electrode receiving wall 34 is a section of the faying surface 24 of the steel workpiece 12 and typically has a size and surface area that corresponds to that of the electrode-contact surface 40. The interface contact surface 42 confronts and makes contact (direct or indirect) with the faying surface 28 of the aluminum workpiece 14 to establish the faying interface 32 between the steel and aluminum workpieces 12, 14 at the weld location 18. During resistance spot welding, as will be described in more detail below, the interface contact surface 42 of the electrode receiving wall 34 is exposed to and wetted by a molten aluminum weld pool during current flow. Upon cooling, the molten aluminum weld pool solidifies into the weld joint 38 that bonds to the interface contact surface 42 of the electrode receiving wall 34 of the steel workpiece 12 and, ultimately, joins the steel and aluminum workpieces 12, 14 together at the weld location 18. By providing the electrode-contact surface 40 with the surface area 44 described above, the interface contact surface 42 of the of the electrode receiving wall 34 will have a surface area that is large enough to support bonding with the weld joint 38.

Figure 4:
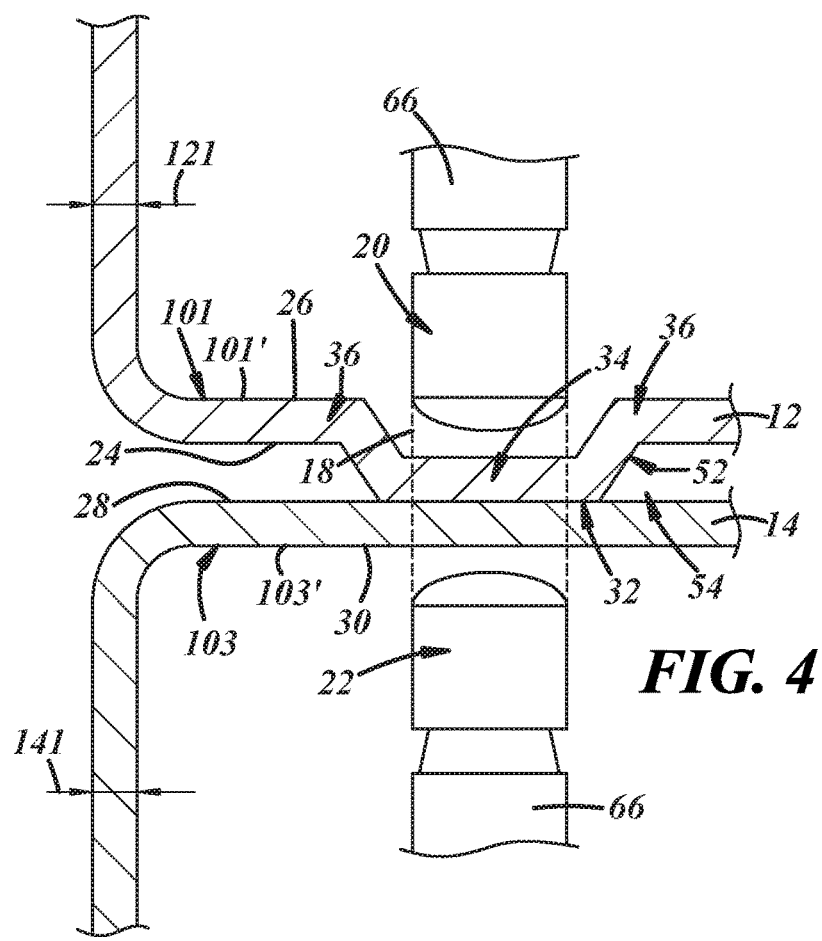
FIG. 4 is a cross-sectional view of the embodiment of the electrode receiving wall and the at least one or more integral elevated portions of the steel workpiece that are disposed at least partially around the electrode receiving wall as shown in FIGS. 1-3.
Figure 5:
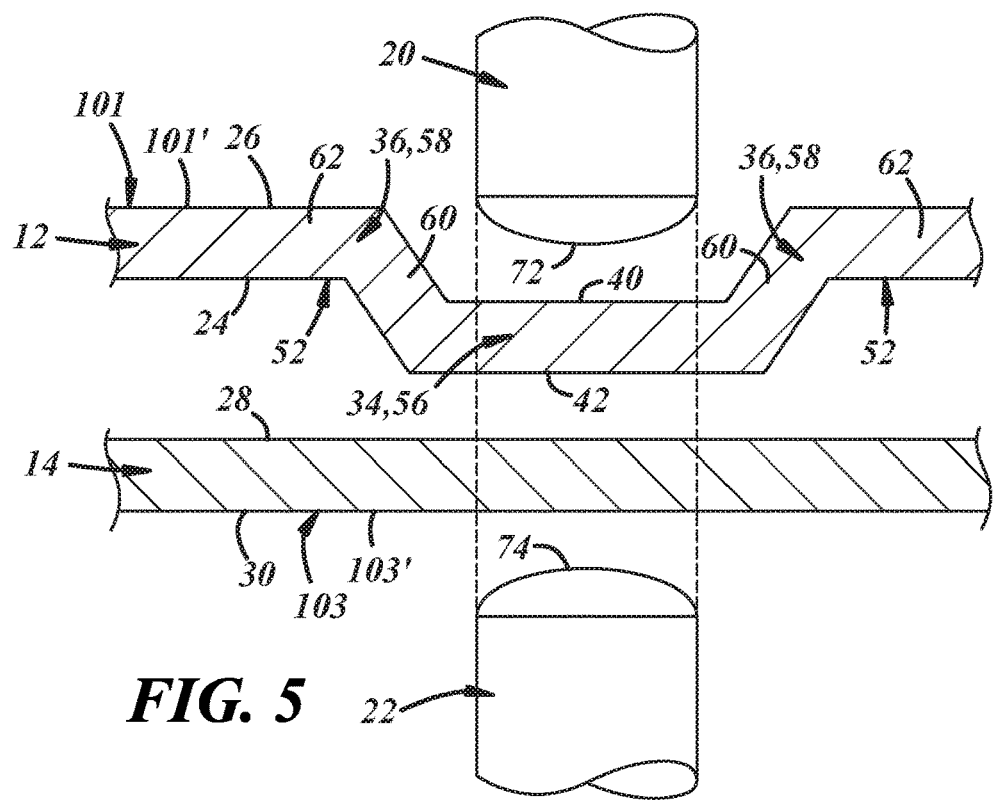
FIG. 5 is an exploded cross-sectional view of the part of the workpiece stack-up at which the steel workpiece and the aluminum workpiece(s) are to be resistance spot welded together by opposed first and second welding electrodes.
Figure 6:
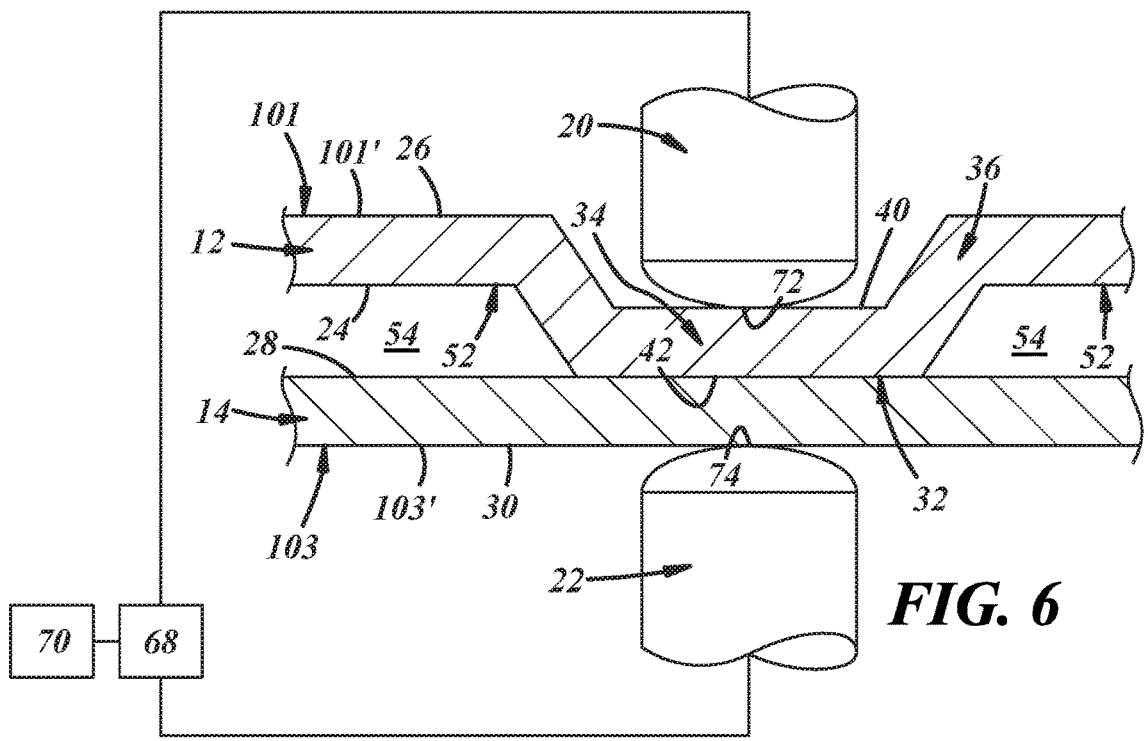
FIG. 6 is a cross-sectional view of the workpiece stack-up after the opposed first and second welding electrodes have engaged the opposed first and second sides of the stack-up, wherein the first weld face of the first welding electrode is pressed against the electrode-contact surface of the electrode receiving wall of the steel workpiece and the second weld face of the second welding electrode is pressed against an exposed back surface of the aluminum workpiece(s) in facial alignment with the first weld face of the first welding electrode.

The one or more integral elevated portions 36 of the steel workpiece 12 that at least partially define the electrode-contact surface 40 of the electrode receiving wall 34 protrude outwardly from, and thus deviate out-of-plane and away from, the electrode-contact surface 40. The one or more integral elevated portions 36 of the steel workpiece 12 may fully or partially enclose the electrode-contact surface 40, and each of the integral elevated portion(s) 36 protrudes to a height above the electrode-contact surface 40 that preferably ranges from 0.2 mm to 10.0 mm or, more narrowly, from 0.5 mm to 6.0 mm. Additionally, because the integral elevated portion(s) 36 of the steel workpiece 12 are outwardly displaced from the electrode-contact surface 40, a segment 52 of the faying surface 24 of the steel workpiece 12 that underlies each of the integral elevated portion(s) 36 deviates out-of-plane and away from the interface contact surface 42 of the electrode receiving wall 34. This segment 52 of the faying surface 24 of the steel workpiece 12, consequently, does not contact the faying surface 28 of the aluminum workpiece 14, but, rather, cooperates with the faying surface 28 of the aluminum workpiece 14 to define a gap 54 that at least partially surrounds the electrode receiving wall 34, as shown in FIGS. 4-6. The one or more integral elevated portions 36 of the steel workpiece 12 may be preformed into the steel workpiece 12 by stamping or any other appropriate metal working procedure.

Referring now specifically to FIGS. 2-3 and 5, one particular embodiment of the electrode receiving wall 34 and the one or more integral elevated portions 36 of the steel workpiece 12 that are at least partially disposed around the electrode receiving wall 34 at the weld location 18 is illustrated. Here, the electrode receiving wall 34 is a round castellation 56, and the electrode-contact surface 40 is circular or ovular in plan view and fully enclosed by a continuous integral elevated portion 58 of the steel workpiece 12 that spans 360° of the circumference of the planar circular region 46. The continuous integral elevated portion 58 of the steel workpiece 12 in this embodiment includes an inclined wall 60 that fully circumscribes the electrode-contact surface 40 and extends outwardly from the electrode-contact surface 40 at an obtuse angle to a base wall 62 of the steel workpiece 12 that surrounds and extends from the inclined wall 60. The obtuse angle of the inclined wall 60 may range from 95° to 150° or, more narrowly, from 100° to 135°. At least a portion of the base wall 62 of the steel workpiece 12 surrounding the electrode receiving wall 34 is separated from the aluminum workpiece 14. In this way, the faying surface 28 of the aluminum workpiece 14 and the segment 52 of the faying surface 24 of the steel workpiece 12 underneath the inclined wall 60 and the portion of the base wall 62 of the steel workpiece 12 that is separated from the aluminum workpiece 14 defines the gap 54 which, in this embodiment, entirely surrounds the interface contact surface 42 of the electrode receiving wall 34. The base wall 62 of the steel workpiece 12 may remain separated from the aluminum workpiece 14 within the workpiece stack-up 10, but, in a preferred practice, the base wall 62 brought back into contact with the aluminum workpiece 14 outside of the weld location 18.

In a variation of the embodiment shown here in FIGS. 2-3, the circular or ovular (in plan view) electrode-contact surface 40 of the round castellation 56 may be truncated and the single integral elevated portion 58 of the steel workpiece 12 may only partially enclose the electrode-contact surface 40. For example, the electrode-contact surface 40 and the interface contact surface 42 may extend to and terminate at a free end of the steel workpiece 12 (identified in FIG. 3 by dashed line 64) located at an edge of the flange assembly 16. The continuous integral elevated portion 58 of the steel workpiece 12 may also extend to and terminate at the free end 64 of the steel workpiece 12, although it does not necessarily have to extend all the way to the free end 64 as illustrated. Accordingly, in this particular variation, the inclined wall 60 only partially circumscribes the electrode-contact surface 38, and anywhere from 180° and 270° of the circumference of the planar circular region 46 is spanned by the integral elevated portion 58 of the steel workpiece 12. To that end, the gap 54 defined by the faying surface 28 the of the aluminum workpiece 14 and the segment 52 of the faying surface 24 of the steel workpiece 12 underneath the inclined wall 60 and the portion of the base wall 62 of the steel workpiece 12 that is separated from the aluminum workpiece 14 only partially surrounds the interface contact surface 42 of the electrode receiving wall 34. Of course, other constructions of the electrode receiving wall 34 and the one or more integral elevated portions 36 are certainly possible beyond what is shown and described in connection with FIGS. 2-3. Some of those alternative constructions are shown in FIGS. 9-12 and described below.

The electrode receiving wall 34 and the one or more integrated elevated portions 36 of the steel workpiece 36 may be used at the weld location 18 in conjunction with a number of different steel and the aluminum workpieces 12, 14 to positively impact the strength of the formed weld joint 36. The steel workpiece 12 may include a steel substrate from any of a wide variety of strengths and grades that is either coated or uncoated. The steel substrate may be hot-rolled or cold-rolled and may be composed of steel such as mild steel, interstitial-free (IF) steel, bake-hardenable steel, high-strength low-alloy (HSLA) steel, dual-phase (DP) steel, complex-phase (CP) steel, martensitic (MART) steel, transformation induced plasticity (TRIP) steel, twining induced plasticity (TWIP) steel, and boron steel such as when the steel workpiece 12 includes press-hardened steel (PHS). The steel workpiece 12 may include a surface layer on one side or both sides of the steel substrate. If coated, the steel substrate preferably includes a surface layer of zinc (e.g., hot-dip galvanized), a zinc-iron alloy (e.g., galvanneal or electrodeposited), a zinc-nickel alloy (e.g., electrodeposited), nickel, aluminum, an aluminum-magnesium alloy, an aluminum-zinc alloy, or an aluminum-silicon alloy, any of which may have a thickness of up to 50 µm on each side of the steel substrate. Taking into account the thickness of the steel substrate and any surface layer that may be present, the steel workpiece 12 has a thickness 121 that ranges from 0.3 mm and 6.0 mm, or more narrowly from 0.6 mm to 2.5 mm, at least at the weld location 18.

The need for local stiffening of the steel workpiece 12 at the weld location 18 may be determined by the mechanical loading of a weld joint. The simplest test for determining whether local stiffening is needed is to teardown or peel apart either representative welded coupons or a section of a welded part by first clamping the steel workpiece and peeling off the aluminum workpiece(s). If the weld joint factures along the interface or a weld button of appropriate size—i.e., $5\sqrt{t}$ where "t" is the thickness of the aluminum workpiece—does not form, then local stiffening of the steel workpiece in a comparative workpiece stack-up may be employed to further improve the mechanical performance of the weld joint(s) formed in the stack-up. Coach peel tests or cross-tension tests may also be used to determine whether local stiffening of the steel workpiece would be effective. A teardown, coach peel test, or cross-tension test can reveal the need to apply local stiffening to the steel workpiece by producing sub-sized weld buttons or weld joints with interfacial fractures. And while the steel workpiece 12 may be any of a variety of steels having different compositions and gauges, certain types of steel may have a tendency to exhibit more pronounced benefits than others when the weld location 18 is locally stiffened in accordance with the present disclosure.

In one implementation, the steel workpiece 12 may be a good candidate for local stiffening at the weld location 18 when it has a thickness of 2.5 mm or less and when the steel substrate is composed of a steel having a yield strength of 250 MPa or less. Interstitial-free steels with a carbon content of 0.01 wt % or less are one example of a class of steels that have a yield strength of 250 MPa or less. The steel workpiece 12 may also be a good candidate for local stiffening at the weld location 18 when the steel substrate has a yield strength of 500 MPa or less, but the thickness 121 of the steel workpiece 12 is 1.8 mm or more and the aluminum workpiece 14 has a thickness 141 of at least 110% of the thickness 121 of the steel workpiece 12 and the aluminum substrate has a yield strength of at least 40% of the steel substrate. Still further, the steel workpiece 12 may be a good candidate for local stiffening at the weld location 18 when the steel substrate is composed of an Advanced High Strength Steel (AHSS) having a yield strength of 1000 MPa or less, while the thickness 121 of the steel workpiece 12 is 1.3 mm or less and the aluminum workpiece 14 has a thickness 141 of at least 150% of the thickness 121 of the steel workpiece 12 and the aluminum substrate has a yield strength of at least 20% of the steel substrate. Dual-phase and press-hardened steels are examples of classes of steels that can have a yield strength of up to 1000 MPa.

In another implementation, the steel workpiece 12 may be a good candidate for local stiffening at the weld location 18 when it has a thickness of 1.0 mm or less and when the steel substrate is composed of a steel having a yield strength of 250 MPa or less. Interstitial-free steels with a carbon content of 0.01 wt % or less are one example of a class of steels that have a yield strength of 250 MPa or less. The steel workpiece 12 may also be a good candidate for local stiffening at the weld location 18 when the steel substrate has a yield strength of 500 MPa or less, but the thickness 121 of the steel workpiece 12 is 0.8 mm or more and the aluminum workpiece 14 has a thickness 141 of at least 125% of the thickness 121 of the steel workpiece 12 and the aluminum substrate has a yield strength of at least 40% of the steel substrate. Still further, the steel workpiece 12 may be a good candidate for local stiffening at the weld location 18 when the steel substrate is composed of an AHSS having a yield strength of 1000 MPa or less, while the thickness 121 of the steel workpiece 12 is 0.6 mm or less and the aluminum workpiece 14 has a thickness 141 of at least 165% of the thickness 121 of the steel workpiece 12 and the aluminum substrate has a yield strength of at least 20% of the steel substrate. Again, here, dual-phase and press-hardened steels are examples of classes of steels that can have a yield strength of up to 1000 MPa.

The aluminum workpiece 14 may include an aluminum substrate that is either coated or uncoated. The aluminum substrate may be composed of unalloyed aluminum or an aluminum alloy that includes at least 85 wt % aluminum. Some notable aluminum alloys that may constitute the coated or uncoated aluminum substrate are an aluminum-magnesium alloy, an aluminum-silicon alloy, an aluminum-magnesium-silicon alloy, and an aluminum-zinc alloy. If coated, the aluminum substrate may include a surface layer comprised of a refractory oxide material such as a native oxide coating that forms naturally when the aluminum substrate is exposed to air and/or an oxide layer created during exposure of the aluminum substrate to elevated temperatures during manufacture, e.g., a mill scale. The refractory oxide material is typically comprised of aluminum oxide compounds and possibly other oxide compounds as well, such as magnesium oxide compounds if, for example, the aluminum substrate is an aluminum-magnesium alloy. The aluminum substrate may also be coated with a layer of zinc, tin, or a metal oxide conversion coating as described in US Pat. Pub. No. 2014/0360986. The surface layer may have a thickness ranging from 1 nm to 10 μm depending on its composition and may be present on each side of the aluminum substrate. Taking into account the thickness of the aluminum substrate and any surface layer that may be present, the aluminum workpiece 14 has a thickness 141 that ranges from 0.3 mm to about 6.0 mm, or more narrowly from 0.5 mm to 3.0 mm, at least at the weld location 18.

The aluminum substrate of the aluminum workpiece 14 may be provided in wrought or cast form. For example, the aluminum substrate may be composed of a 4xxx, 5xxx, 6xxx, or 7xxx series wrought aluminum alloy sheet layer, extrusion, forging, or other worked article. Alternatively, the aluminum substrate may be composed of a 4xx.x, 5xx.x, or 7xx.x series aluminum alloy casting. Some more specific kinds of aluminum alloys that may constitute the aluminum substrate include, but are not limited to, AA5754 and AA5182 aluminum-magnesium alloy, AA6111 and AA6022 aluminum-magnesium-silicon alloy, AA7003 and AA7055 aluminum-zinc alloy, and Al-10Si—Mg aluminum die casting alloy. The aluminum substrate may further be employed in a variety of tempers including annealed (O), strain hardened (H), and solution heat treated (T), if desired. The term "aluminum workpiece" as used herein thus encompasses unalloyed aluminum and a wide variety of aluminum alloys, whether coated or uncoated, in different spot-weldable forms including wrought sheet layers, extrusions, forgings, etc., as well as castings.

Referring now to FIGS. 4-8, a method of resistance spot welding the steel and aluminum workpieces together with the electrode receiving wall 34 and integrated elevated portion(s) 36 incorporated into the steel workpiece 12 is illustrated. In each of FIGS. 4-8, the workpiece stack-up 10 is depicted along with the first welding electrode 20 and the second welding electrode 22. The first and second welding electrodes 20, 22 are mechanically and electrically coupled to a weld gun 66 (partially shown in FIG. 4) and are positionable relative to the workpiece stack-up 10 to pass an electric current through the stack-up 10 and across the faying interface 32 of the steel and aluminum workpieces 12, 14 at the weld location 18. The weld gun 66 is preferably C-type or an X-type weld gun that is mounted to a robot capable of moving the weld gun 66 around the workpiece stack-up 10 in a programmed progression, although the weld gun 66 may also be configured on a stationary pedestal. Additionally, as illustrated schematically here, the weld gun 66 may be associated with a power supply 68 that delivers electric current between the welding electrodes 20, 22 according to a programmed weld schedule administered by a weld controller 70. The weld gun 66 may also be fitted with coolant lines and associated control equipment in order to deliver a coolant fluid, such as water, to each of the welding electrodes 20, 22 to help control the temperatures of the welding electrodes 20, 22 during and after current flow.

The first welding electrode 20 includes a first weld face 72 and the second welding electrode 22 includes a second weld face 74. The first and second weld faces 72, 74 are the portions of the first and second welding electrodes 20, 22 that make contact with and are impressed into the workpiece stack-up 10 during the time that the electric current is being passed through the stack-up 10 between the weld faces 72, 74. As depicted best in FIG. 6, the first weld face 72 of the first welding electrode 20 is positioned to contact the steel workpiece surface 101' of the first side 101 of the workpiece stack-up 10, and the second weld face 74 of the second welding electrode 22 is positioned to contact the aluminum workpiece surface 103' of the second side 103 of the workpiece stack-up 10 opposite from, and in facial alignment with, the first weld face 72. The weld gun 66 is operable to bring the first and second weld faces 72, 74 of the first and second welding electrodes 20, 22 into contact with their respective sides 101, 103 of the workpiece stack-up 10 and to clamp the welding electrodes 20, 22 towards each other and to impose a clamping force on the stack-up 10 at the weld location 18. The power supply 68 that delivers electric current for passage between the first and second welding electrodes 20, 22 during spot welding of the workpiece stack-up 10 is preferably a medium-frequency direct current (MFDC) inverter power supply that electrically communicates with the first and second welding electrodes 20, 22. The power supply 68 may be configured to pass direct current (DC) between the welding electrodes 20, 22 at current levels up to 50 kA in accordance with a programmed weld schedule.

Each of the first and second welding electrodes 20, 22 may be constructed in any of a wide variety of designs. The second weld face 74 of the second welding electrode 22 may have a diameter that ranges from 6 mm to 20 mm, or more narrowly from 8 mm to 15 mm, and may be planar or convexly domed. The first weld face 72 of the first welding electrode 20 may match the size and shape of the second weld face 74 or, alternatively, it may have a diameter that ranges from 3 mm to 16 mm, or more narrowly from 4 mm to 8 mm, and may be planar or convexly domed. Each of the first and second weld faces 72, 74 may also include surface features such as one or more of the following: (1) concentric rings of ridges; (2) concentric rings of grooves; (3) a macrotexture; (4) a series of steps or terraces; and/or (5) a central plateau. The first and second weld faces 72, 74 may be symmetric or asymmetric. Additionally, at least the first weld face 72, 74 of each of the first and second welding electrodes 20, 22, and preferably the entire first and second welding electrodes 20, 22, may be constructed from a material having an electrical conductivity of at least 45% IACS ($2.61 \times 10^{-7}$ S/m) and a thermal conductivity of at least 180 W/mk. Some materials that meet these criteria include a C15000 copper-zirconium (CuZr) alloy, a C18200 copper-chromium (CuCr) alloy, a C18150 copper-chromium-zirconium (CuCrZr) alloy, a refractory-based material such as a tungsten-copper composite that contains between 50 wt % and 90 wt % of a tungsten particulate phase dispersed in a copper matrix, and a dispersion-strengthened copper material such as copper with an aluminum oxide dispersion. Other materials not expressly listed here that meet the applicable electrical and thermal conductivity standards may also be used as well.

The resistance spot welding of the workpiece stack-up 10 in accordance with the present disclosure involves first providing the workpiece stack 10 including the pair of adjacent steel and aluminum workpieces 12, 14 together with the optional broadly-applied intermediate organic material layer. The workpiece stack-up 10 may be provided by forming the electrode receiving wall 34 and the one or more integral elevated portions 36 that are disposed at least partially around the electrode receiving wall 34 in the steel workpiece 12. This forming process can be accomplished by any of a wide variety of metal working procedures. In a preferred embodiment, particularly when the electrode receiving wall 34 is a round castellation 56 or any other type of castellation (including the linear castellation depicted in FIGS. 9-10), the electrode receiving wall 34 and the integral elevated portion(s) of the steel workpiece 12 may be formed by stamping. With the electrode receiving wall 34 the integral elevated portion(s) of the steel workpiece 12 formed, the steel workpiece 12 and the aluminum workpiece 14 may be assembled into the workpiece stack-up 10 along with the optional broadly-applied intermediate organic material layer. Suitable fixturing equipment may be used to bring the steel and aluminum workpieces 12, 14 together and to hold them in place during assembly.

Once the workpiece stack-up 10 is provided, and the interface contact surface 42 of the electrode receiving wall 34 of the steel workpiece 12 confronts and is brought into contact (direct or indirect) with the faying surface 28 of the aluminum workpiece 14 at the weld location 18 as depicted in FIG. 6, the workpiece stack-up 10 is positioned between the first welding electrode 20 and the opposed second welding electrode 22. The weld gun 66 is then operated to converge the first and second welding electrodes 20, 22 relative to one another. In so doing, the first weld face 72 of the first welding electrode 20 makes contact with and is pressed against the electrode-contact surface 40 of the electrode receiving wall 34 of the steel workpiece 12 (which constitutes the steel workpiece surface 101'), and the second weld face 74 of the second welding electrode 22 makes contact and is pressed against the back surface 30 of the aluminum workpiece 14 (which constitutes the aluminum workpiece surface 103' in this embodiment) in facial alignment with the first weld face 72. The weld faces 72, 74 may be clamped in place at the weld location 18 under a clamping force that ranges from 400 lb (pounds force) to 2000 lb or, more narrowly, from 600 lb to 1300 lb.

Figure 7:
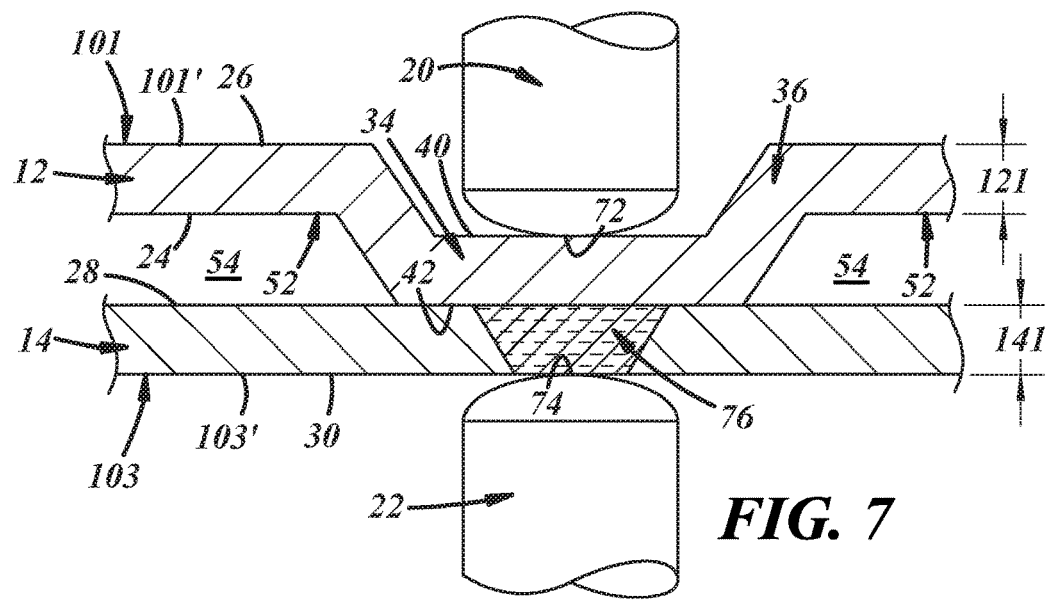
FIG. 7 is a cross-sectional view of the workpiece stack-up after the opposed first and second welding electrodes have engaged the opposed first and second sides of the stack-up, as shown in FIG. 6, and during the passage of an electric current between the first and second welding electrodes, wherein the passage of the electric current between the first and second welding electrodes and through the workpiece stack-up has created a molten aluminum weld pool within the aluminum workpiece(s) that wets the adjacent interface contact surface of the electrode receiving wall of the steel workpiece.
Figure 8:
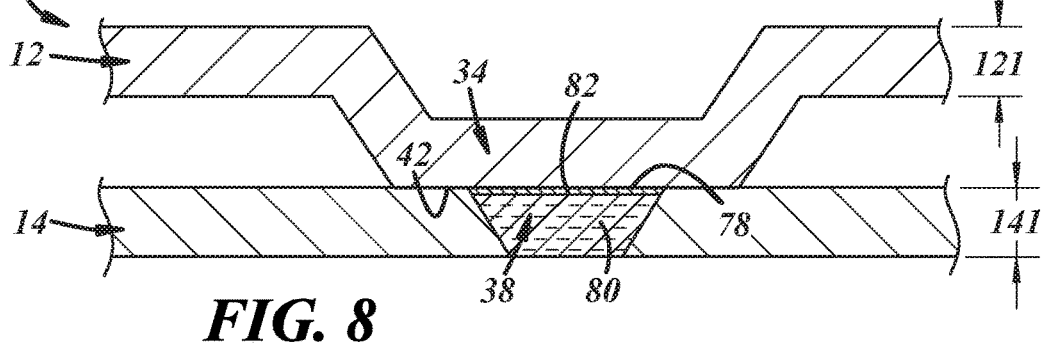
FIG. 8 is a cross-sectional view of the workpiece stack-up after the molten aluminum weld pool shown in FIG. 7 has been allowed to solidify into a weld joint that bonds the steel and aluminum workpiece(s) together.

After the weld faces 72, 74 of the first and second welding electrodes 20, 22 are pressed against their respective sides 101, 103 of the workpiece stack-up 10 in accommodation with the electrode receiving wall 34, an electric current is momentarily passed between the facially aligned weld faces 72, 74 to form the weld joint 38, as shown in FIGS. 7-8. The exchanged electric current may be constant or pulsed over time, or some combination of the two, and typically has a current level that ranges from 5 kA rms (root mean squared) and 50 kA rms and lasts for a total duration of 50 ms to 5000 ms or, more narrowly, for a total duration of 200 ms to 2000 ms. As a few specific examples, the schedule of the applied electric current may be in the nature of the multi-step weld schedule disclosed in US2015/0053655 or US2017/0106466, the entire contents of each of those applications being incorporated herein by reference, or another weld schedule that is suitable for the workpiece stack-up 10. As the electric current flows between the first and second weld faces 72, 74 of the first and second welding electrodes 20, 22, the more electrically- and thermally-resistive steel workpiece 12 heats quite rapidly. This heat is transferred to the aluminum workpiece 14 through the interface contact surface 42 of the electrode receiving wall 34 and causes the aluminum workpiece 14 to begin to melt at the weld location 18. The melting of the aluminum workpiece 14 creates a molten aluminum weld pool 76 as shown in FIG. 7. The molten aluminum weld pool 76 is contained within the aluminum workpiece 14 and wets the adjacent interface contact surface 42 of the electrode receiving wall 34 of the steel workpiece 12.

During the period of time in which the molten aluminum weld pool 76 is growing within the aluminum workpiece 14 to is final size, the second weld face 74 of the second welding electrode 22 impresses further into the second side 103 of the workpiece stack-up 10, which successively brings more of the second weld face 74 into pressed contact with the exposed back surface 30 of the aluminum workpiece 14. The continued impression of the second weld face 74 of the second welding electrode 22 eventually contains the molten aluminum weld pool 76 within the outer circumference of the second weld face 74. The molten aluminum weld pool 76 may have a diameter along the interface contact surface 42 of the electrode receiving wall 34 of the steel workpiece 12 that ranges from 3 mm to 15 mm, or more narrowly from 6 mm to 12 mm, and may penetrate a distance into the aluminum workpiece 14 that ranges from 10% to 100%, or more preferably from 20% to 80%, of the thickness 141 of the aluminum workpiece 14 at the weld location 18. And, in terms of its composition, the molten aluminum weld pool 76 is comprised of aluminum material derived from the aluminum workpiece 14 in addition to a small amount of diffused iron from the steel workpiece 12 and material that may be introduced into the weld pool 76 from workpiece surface layers.

The passage of the electric current between the weld faces 72, 74 of the first and second welding electrodes 20, 22 is eventually terminated, which drops current flow to below 1 kA as some inductance may still be present in the system, thereby allowing the molten aluminum weld pool 76 to solidify into the weld joint 38 as depicted in FIG. 8. The weld joint 38 is the material that weld bonds the adjacent steel and aluminum workpieces 12, 14 together. In particular, the weld joint 38 establishes a bonding interface 78 with the interface contact surface 42 of the electrode receiving wall 34 of the steel workpiece 12 and includes two main components: (1) an aluminum weld nugget 80 and (2) a Fe—Al intermetallic layer 82. The aluminum weld nugget 80 is comprised of resolidified aluminum and extends into the aluminum workpiece 14 to a distance that ranges from 10% to 100%, or more narrowly from 20% to 80%, of the thickness 141 of the aluminum workpiece 14 at the weld location 18. The Fe—Al intermetallic layer 82 is situated between the aluminum weld nugget 80 and the interface contact surface 42 of the steel workpiece 12 and is contiguous with the bonding interface 78. The Fe—Al intermetallic layer 82 is produced due to a reaction between the molten aluminum weld pool 76 and iron that diffuses into the weld pool 76 from the steel workpiece 12 at spot welding temperatures and often has an average thickness of 1 μm to 5 μm along the bonding interface 78 of the weld joint 38 and the steel workpiece 12. Intermetallic compounds such as $FeAl_3$ compounds, $Fe_2Al_5$ compounds, and possibly other Fe—Al intermetallic compounds may be found in the Fe—Al intermetallic layer 82. The Fe—Al intermetallic layer 82 is harder, more brittle, and less tough than the aluminum weld nugget 80.

After spot welding is completed, and the weld joint 38 is formed so as to weld bond the steel and aluminum workpieces 12, 14 together at the weld location 18, the clamping force imposed by first and second welding electrodes 20, 22 is relieved and the electrodes 20, 22 are retracted away from their respective workpiece sides 101, 103 of the workpiece stack-up 10. The workpiece stack-up 10 may now be moved relative to the weld gun 66 so that the first and second welding electrodes 20,22 are positioned in facing alignment at another weld location 18, which may or may not include an electrode receiving wall 34 and one or more integral elevated portions 36 incorporated into the steel workpiece 12, and the spot welding method may be repeated. Or, rather than undergoing spot welding at a different weld location 18, the workpiece stack-up 10 may be moved away from the weld gun 66 to make room for another workpiece stack-up 10. Once the workpiece stack-up 10 has been spot welded at all of its designated weld locations 18, the stack-up 10 may be further processed. For example, the workpiece stack-up 10 may be painted. Typical paint back operations that accompany the painting process may involve heating the stack-up 10 in an ELPO back oven or other oven to temperatures in the range of 160° C. to 190° C. Such heating may elicit a hardening response in the aluminum substrate as well as the heat-affected zone (HAZ) of the aluminum workpiece 14 which, in turn, may render the steel workpiece 12 more susceptible to experiencing early and excessive deformation relative to the aluminum workpiece 14 when the weld joint 38 is subjected to loading.

The practice of the present disclosure as it relates to resistance spot welding one or more aluminum workpieces to a steel workpiece is not limited solely to the electrode receiving wall 34 described above and shown in FIGS. 1-8 or the particular construction of the workpiece stack up 10. The electrode receiving wall 34 may assume an alternative construction, some examples of which are shown in FIGS. 9-12, and/or the number of aluminum workpieces included in the workpiece stack-up may be greater than one as depicted, for example, in FIGS. 13-14. In the following discussion of alternative embodiments, reference numerals that correspond to the reference numerals used in the description of the previous embodiment will be used to identify like elements having like functionality. To that end, the description of aspects of the previously-described embodiment shown in FIGS. 1-8 apply equally to aspects of the following embodiments that are identified with corresponding reference numerals unless specifically described otherwise. Only the material differences in of the alternative embodiments shown in FIGS. 9-14 will be discussed in detail below.

Figure 9:
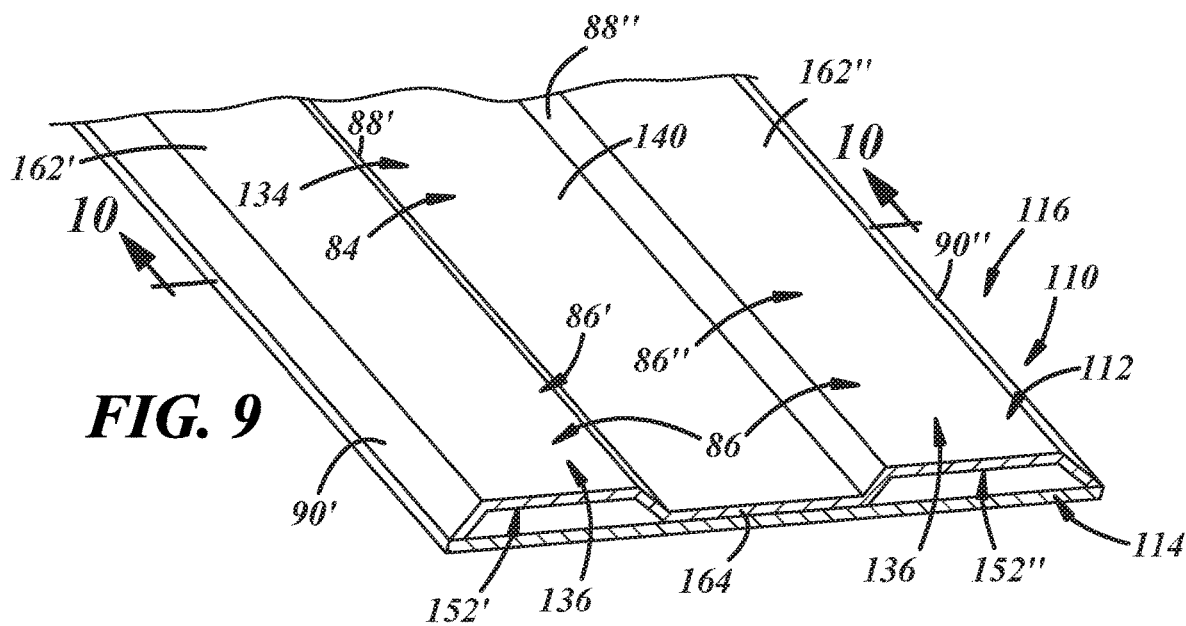
FIG. 9 is an elevated perspective view of the steel workpiece including, in particular, an above view of an alternative embodiment of an electrode receiving wall formed at a weld location along with one or more integral elevated portions of the steel workpiece at least partially around the electrode receiving wall.
Figure 10:
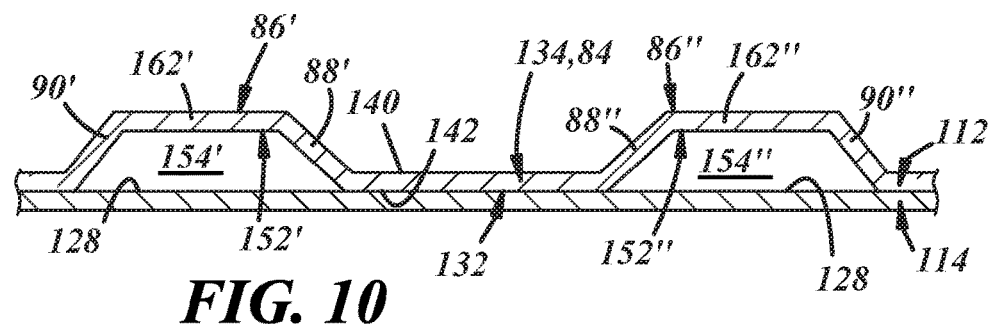
FIG. 10 is a cross-sectional view of the embodiment of the electrode receiving wall and the at least one or more integral elevated portions of the steel workpiece that are at least partially disposed around the electrode receiving wall as shown in FIG. 9.

Referring now to FIGS. 9-10, an alternative embodiment of the steel workpiece is illustrated. The electrode receiving wall in this embodiment is identified by reference numeral 134 and, as shown, is a linear castellation 84. The electrode-contact surface 140 of the linear castellation 84 may be rectangular in plan view and it may extend longitudinally inward from the free end 164 of the steel workpiece 112 at the edge of the flange assembly 116, although it certainly does not have to terminate at the free end 164. The electrode-contact surface 140 may be defined at least partially by a pair of lateral integral elevated portions 86 of the steel workpiece 112 due to the fact that the electrode-contact surface 140 terminates at the free end 164 of the steel workpiece 112. The pair of lateral integral elevated portions 86 includes a first lateral integral elevated portion 86' and a second lateral integral elevated portion 86". The first and second integral elevated portions 86', 86" of the steel workpiece 112 may be distinct from one another, as shown, or they may interconnect around an end of the electrode-contact surface 140 opposite the free end 164 of the steel workpiece 112 as part of a larger continuous integral elevated portion of the steel workpiece 112 that essentially have a U-shape. Preferably, and as with the embodiment illustrated in FIGS. 4-5, anywhere from 90° to 360°, and more narrowly anywhere from 120° to 360°, of a circumference of the planar circular region 46 is spanned by the integral elevated portion(s) 36 of the steel workpiece 12. In this case, where more than one integral elevated portion 86', 86" of the steel workpiece 112 is encompassed by the planar circular region 46 (FIG. 3), the angles defined by the by the intersections of the integral elevated portion 86', 86" and the circumference of the planar circular region 46 are added together.

Each of the first and second lateral integral elevated portions 86', 86" of the steel workpiece 112 may include a first inclined wall 88', 88" that extends outwardly from the electrode-contact surface 140 at an obtuse angle to a base wall 162', 162", and may further include a second inclined wall 90', 90" that extends inwardly towards the aluminum workpiece 114 to either another electrode receiving wall 134 or to an extended portion of the steel workpiece 112 that contacts the aluminum workpiece 114 outside of the weld location 118. The obtuse angle of each of the inclined walls 88', 88" may range from 95° to 150° or, more narrowly, from 100° to 135°. Accordingly, in this embodiment, the segment 152', 152" of the faying surface 124 of the steel workpiece 112 underneath the first inclined wall 88', 88", the base wall 162', 162", and the second inclined wall 90', 90" of each of the lateral integrated elevated portions 86', 86" of the steel workpiece 112 defines a gap 154', 154" in combination with the faying surface 128 of the aluminum workpiece 114. These gaps 154', 154" extend lengthwise along the interface contact surface 142 of the electrode receiving wall 134 of the steel workpiece 112.

Figure 11:
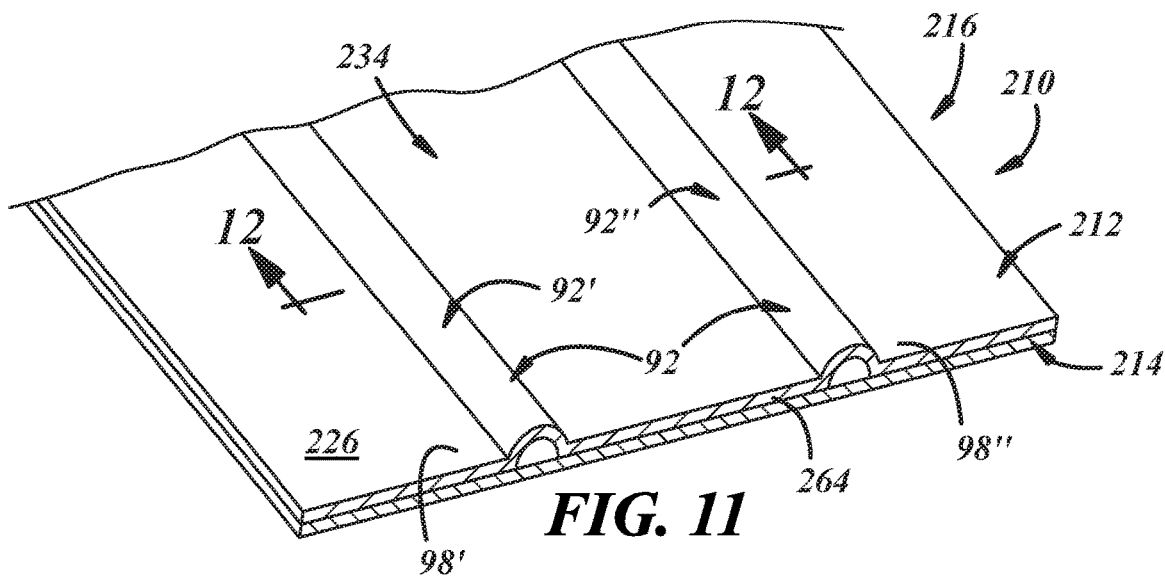
FIG. 11 is an elevated perspective view of the steel workpiece including, in particular, an above view of yet another alternative embodiment of an electrode receiving wall formed at a weld location along with one or more integral elevated portions of the steel workpiece at least partially around the electrode receiving wall.
Figure 12:
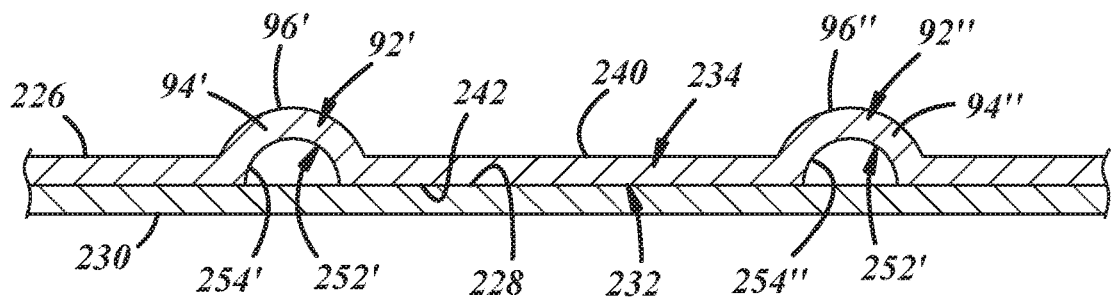
FIG. 12 is a cross-sectional view of the embodiment of the electrode receiving wall and the at least one or more integral elevated portions of the steel workpiece that are at least partially disposed around the electrode receiving wall as shown in FIG. 11.

Referring now to FIGS. 11-12, another alternative embodiment of the steel workpiece is illustrated. The electrode receiving wall in this embodiment is identified by reference numeral 234 and, as shown, is a portion of the steel workpiece 212 between two spaced apart strengthening ribs 92. The strengthening ribs 92 may include a first strengthening rib 92' and a second strengthening rib 92", each of which extends longitudinally inward from the free end 264 of the steel workpiece 212 at the edge of the flange assembly 216. Each of the spaced apart strengthening ribs 92', 92" includes an arcuate wall 94', 94" that arises from the back surface 226 of the steel workpiece 212. An outer surface 96', 96" of the arcuate wall 94', 94" of each strengthening rib 92', 92" protrudes outwardly from the electrode-contact surface 240 and an outboard portion 98', 98" of the back surface 226 of the steel workpiece 212 outside of the electrode receiving wall 234. Similarly, the segment 252', 252" of the faying surface 224 of the steel workpiece 212 underneath the arcuate wall 94', 94" of each strengthening rib 92', 92" defines the gap 254', 254" in combination with the faying surface 228 of the aluminum workpiece 214. These gaps 254', 254" extend lengthwise along but do not entirely surround the interface contact surface 242 of the electrode receiving wall 234 of the steel workpiece 212. And, while the strengthening ribs 92', 92" depicted here are linear in plan view along the back surface 226 of the steel workpiece 212, in other variations one or both of the ribs 92', 92" may be curved in plan view along the back surface 226 of the steel workpiece 212 such that the electrode-contact surface 240 of the receiving wall 234 is round in plan view.

Figure 13:
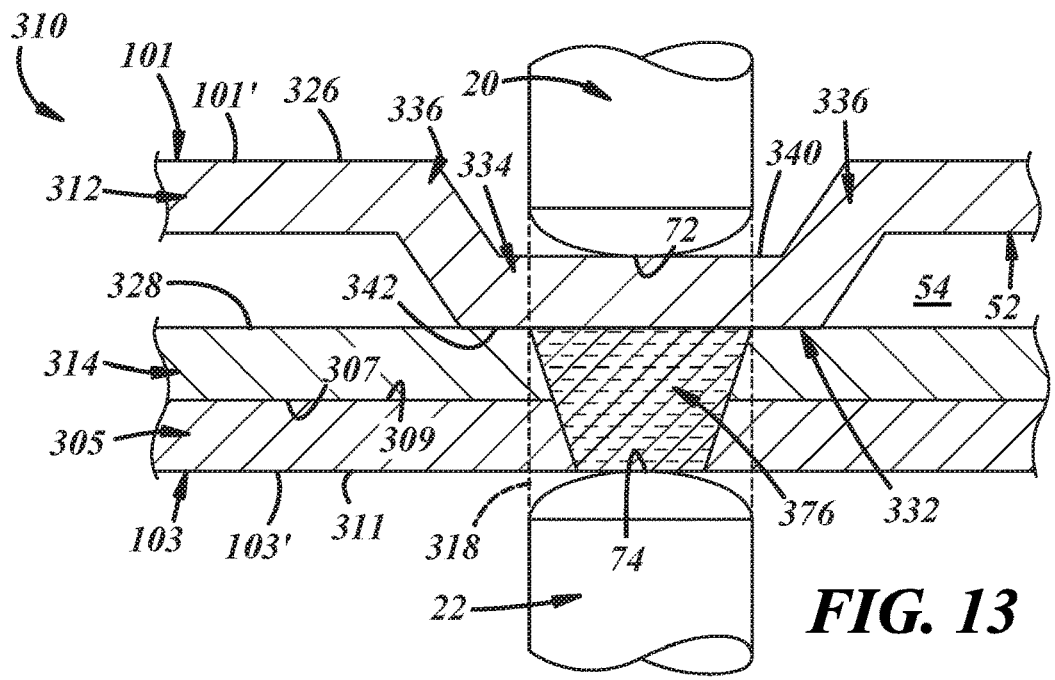
FIG. 13 is a cross-sectional view of an embodiment of the workpiece stack-up that may be resistance spot welding according to practices of the present disclosure in which the stack-up includes at least a steel workpiece, which includes an electrode receiving wall formed at a weld location along with one or more integral elevated portions of the steel workpiece at least partially around the electrode receiving wall, as well as an aluminum workpiece that lies adjacent to the steel workpiece and at least one more additional aluminum workpiece, and wherein opposed first and second welding electrodes are pressed against opposite first and second sides of the workpiece stack-up and an electric current being passed between the welding electrodes has created a molten aluminum weld pool within the aluminum workpieces that wets the adjacent interface contact surface of the electrode receiving wall of the steel workpiece.
Figure 14:
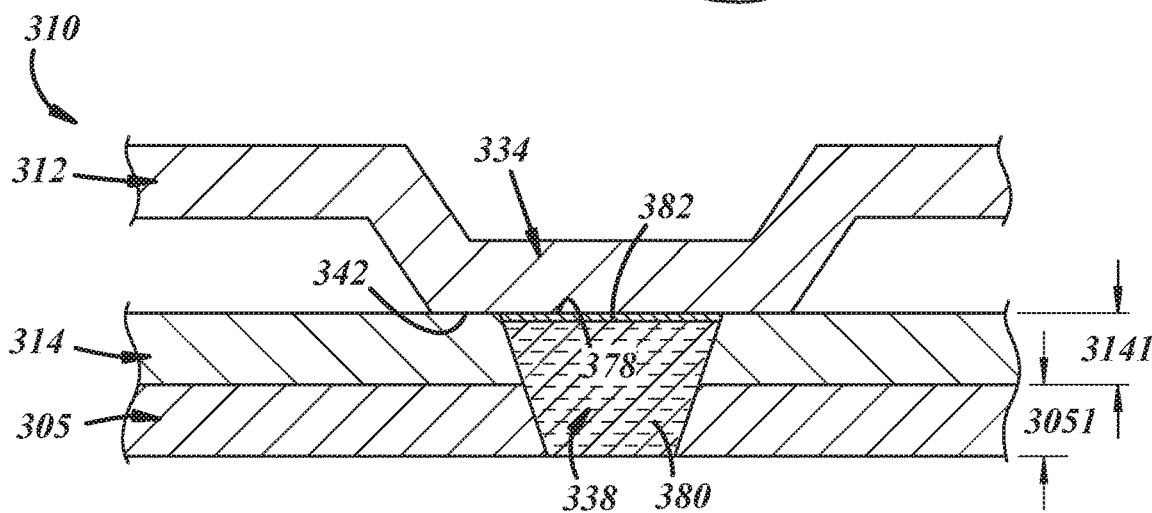
FIG. 14 is a cross-sectional view of the workpiece stack-up after the molten aluminum weld pool shown in FIG. 13 has been allowed to solidify into a weld joint that bonds the steel and aluminum workpieces together.

Still further, and referring now to FIGS. 13-14, the workpiece stack-up may include more than one aluminum workpiece with the caveat that the aluminum workpieces are grouped and positioned adjacent to each other in the stack-up. The workpiece stack-up in this embodiment is identified by reference numeral 310 and includes at least one additional aluminum workpiece 305. As for the characteristics of the additional aluminum workpiece 305 included in the stack-up 310, the description of the aluminum workpiece 314 above in connection with the embodiment shown in FIGS. 1-8 is applicable to this and any other additional aluminum workpieces that may be included in the workpiece stack-up 310. It should be noted, though, that while the same general description applies, there is no requirement that the additional aluminum workpiece(s) be identical in terms of composition, thickness, or form (e.g., wrought or cast) to the aluminum workpiece 314 that lies adjacent to the steel workpiece 312 within the workpiece stack-up 310.

As illustrated in FIG. 13, the additional aluminum workpiece 305 overlaps and is disposed next to the aluminum workpiece 314 that lies adjacent to the steel workpiece 312. When the additional aluminum workpiece 305 is so positioned within the stack-up 310, the back surface 326 of the steel workpiece 312 constitutes the steel workpiece surface 101' that provides the first side 101 of the workpiece stack-up 310, as before, while the aluminum workpiece 305 that lies adjacent to the steel workpiece 312 now includes a pair of opposed faying surfaces 328, 307. The faying surface 328 of the aluminum workpiece 314 that faces the steel workpiece 314 continues to make contact with the interface contact surface 342 of the electrode receiving wall 334 of the steel workpiece 312 to establish the faying interface 330 between the two workpieces 312, 314 at the weld location 318, as previously described. The other faying surface 307 of the aluminum workpiece 314 overlaps and confronts a faying surface 309 of the additional aluminum workpiece 305. As such, in this particular arrangement of lapped workpieces 312, 314, 305, an exposed back surface 311 of the additional aluminum workpiece 305 now constitutes the aluminum workpiece surface 103' that provides the second side 103 of the workpiece stack-up 310.

The workpiece stack-up 310 shown here in FIGS. 13-14 can be resistance spot welded in the same way as previously described. In particular, the steel workpiece 312 and the aluminum workpieces 314, 305 are first assembled into the workpiece stack-up 310. The electrode receiving wall 334 and the one or more integral elevated portions 336 incorporated into the steel workpiece 312 at the weld location(s) 18 may be constructed in conformity with any of the embodiments 34, 36, 134, 136, 234, 236 described above or variations thereof. Once assembled, the first weld face 72 of the first welding electrode 20 is pressed against the electrode-contact surface 340 of the electrode receiving wall 334 of the steel workpiece 312 (which constitutes the steel workpiece surface 101' at the first side 101 of the stack-up 310), and, likewise, the second weld face 74 of the second welding electrode 22 is pressed against the exposed back surface 311 of the additional aluminum workpiece 305 (which in this embodiment constitutes the aluminum workpiece surface 103' at the second side 103 of the stack-up 310) in facial alignment with the first weld face 72. An electric current is then momentarily passed between the facially aligned weld faces 72, 74 to create a molten aluminum weld pool 376 that ultimately solidifies into a weld joint 338 in the same way as described above.

The weld joint 338 formed in the workpiece stack-up 310 has the same structure as before; that is, the weld joint 336 includes an aluminum weld nugget 380 and a Fe—Al intermetallic layer 382. Also, and similar to before, the weld joint 338 establishes a bonding interface 378 with the interface contact surface 342 of the electrode receiving wall 334 of the steel workpiece 312. However, in this embodiment, the aluminum weld nugget 380 of the weld joint 338 extends through the entire thickness 3141 of the aluminum workpiece 314 that lies adjacent to the steel workpiece 312 and, furthermore, continues to extend into the additional aluminum workpiece 305 to a distance that ranges from 10% to 100%, or more narrowly from 20% to 80%, of a thickness 3051 of the additional aluminum workpiece 305 at the weld location 318. To that end, the weld joint 338 has the dual functionality of (1) fusion welding the two aluminum workpieces 314, 305 together and (2) metallurgically bonding the fusion-joined aluminum workpieces 314, 305 to the steel workpiece 312 by way of the bonding interface 378 established between the weld joint 338 and the interface contact surface 342 of the electrode receiving wall 334 of the steel workpiece 312.

The localized stiffening effect attributed to the electrode receiving wall 34, 134, 234, 334 and the one or more integral elevated portions 36, 136, 236, 336 at the weld location 18, 118, 218, 318 strengthens the weld joint 38, 338 that bonds the steel workpiece and aluminum workpieces together under certain circumstances. The electrode receiving wall 34, 134, 234, 334 and the one or more integral elevated portions 36, 136, 236, 336 stiffen the steel workpiece 12, 112, 212, 312 by limiting the amount of strain, especially plastic strain, experience by the steel workpiece 12, 112, 212, 312 at the interface contact surface 42, 142, 242, 342 of the electrode receiving wall 34, 134, 234, 334. Excessive strain, especially plastic strain, experienced by the steel workpiece 12, 112, 212, 312 at the weld location 18, 118, 218, 318 can cause the relatively brittle intermetallic layer 82, 382 of the weld joint 38, 338 to fracture, thereby causing interfacial or partial interfacial failure of the joint 38, 338 and low strength. As a result of such stiffening, deformation of the steel workpiece 12, 112, 212, 312 is resisted when the weld joint 38, 338 is loaded, which helps to inhibit the steel workpiece from undergoing excessive deformation earlier and/or at a faster rate than the aluminum workpiece(s) 14, 114, 214, 314, 305 included in the stack-up 10, 110, 210, 310 in proximity to the weld location 18, 118, 218, 318 12, 112, 212, 312 when there is a more than insignificant inherent stiffness disparity between the steel workpiece 12, 112, 212, 312 and the adjacent aluminum workpiece(s) 14, 114, 214, 314, 305. In other words, by locally stiffening the steel workpiece 12, 112, 212, 312 at the weld location 18, 118, 218, 318, the weld joint 38, 338, which might have a quality microstructure and be considered structurally sound, is protected from premature failure on account of fracturing of the intermetallic layer 82, 382 due deformation or strain experienced by the intermetallic layer 82, 382.

To demonstrate the positive impact on weld strength that may be attained by incorporating the electrode receiving wall 34, 134, 234, 334 and the one or more integral elevated portions 36, 136, 236, 336 into the steel workpiece 12, 112, 212, 312 at the weld location 18, 118, 218, 318, a series of coach peel tests were performed on resistance spot welds formed with and without the assistance of localized stiffening. For comparison purposes, seven resistance spot weld joints were formed between a 1.2-mm galvanized low carbon steel coupon and a 1.2-mm AA6022-T4 aluminum coupon. Initially, the steel and aluminum coupons were planar and, thus, no localized stiffening was incorporated into the steel workpiece. Each of the seven weld joints was formed in a way that produced a sound weld microstructure. After welding, the welded samples were baked in an oven at 175° C. to simulate ELPO bake exposure in a plant. The weld joints were then subjected to coach peel testing and the results plotted on the graph shown in FIG. 15. In that graph, the coach peel strength of each weld joint, reported in Newtons (N) (left y-axis), is identified by a circle, and the energy needed to break the coupons apart, reported in Joules (J) (right y-axis), is identified by an "X." Additionally, the height of any rectangular bar constitutes the average diameter of a weld button, if present, and is reported in millimeters (mm) (also the right y-axis). The absence of a rectangular bar for any particular weld joint means that a weld button was not obtained.

Figure 15:
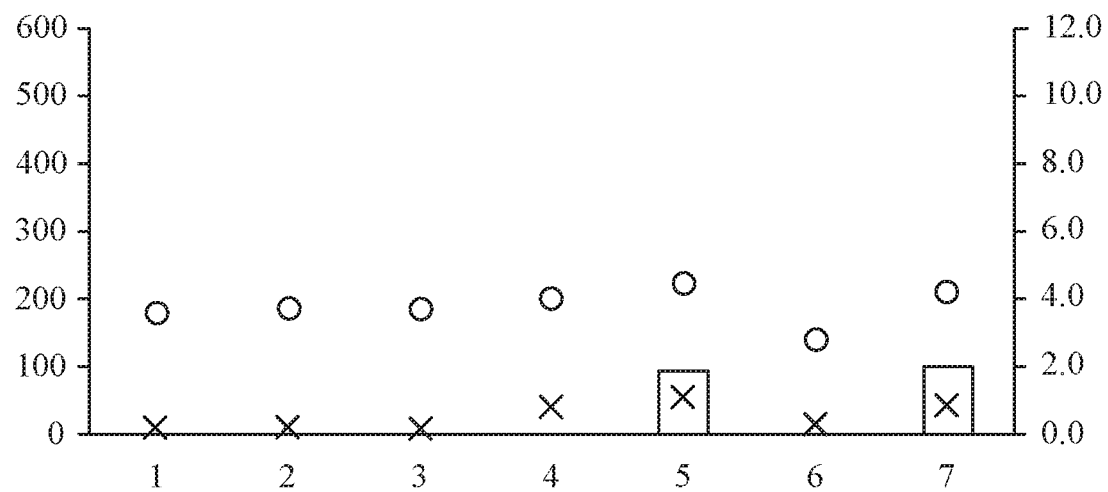
FIG. 15 depicts a graph of coach peel testing results for seven weld joints formed between a planar steel coupon and an overlapping planar aluminum coupon. In this graph, the left y-axis represents coach peel strength in Newtons (N) and the right y-axis represents both the energy needed to break the coupons apart in Joules (J) and the diameter of a weld button (if any). Additionally, the coach peel strength of each weld joint is identified by a circle, the energy needed to break the coupons apart is identified by an "X," and the height of any rectangular bar constitutes the average diameter of a weld button, if present. The absence of a rectangular bar for any particular weld joint means that a weld button was not obtained.

As can be seen, the seven baked spot weld joints that were subjected to coach peel testing without the benefit of localized stiffening of the steel workpiece had an observed average peel strength of 188 N, an observed average energy to break of 0.52 J, and more often than not did not produce a weld button but, instead, suffered from interfacial joint fracture. In fact, only two of the seven weld joints produced weld buttons during coach peel testing. And, as shown in FIG. 15, the size of the weld buttons produced in those two instances was rather small, having an observed average diameter of approximately 2.0 mm. Because the weld joints formed without local stiffening of the steel workpiece had a sound microstructure that, in and of itself, should have produced better coach peel testing results, it is believed that the early onset and/or excessive rate of strain exhibited by the steel coupon compared to the aluminum coupon during testing transferred a high level of stress to the Fe—Al intermetallic layer of the weld joint. This significant and sudden stress caused the otherwise structurally sound weld joints to fracture along their bonding interface with the aluminum coupon where the brittle Fe—Al intermetallic layer is present.

Figure 16:
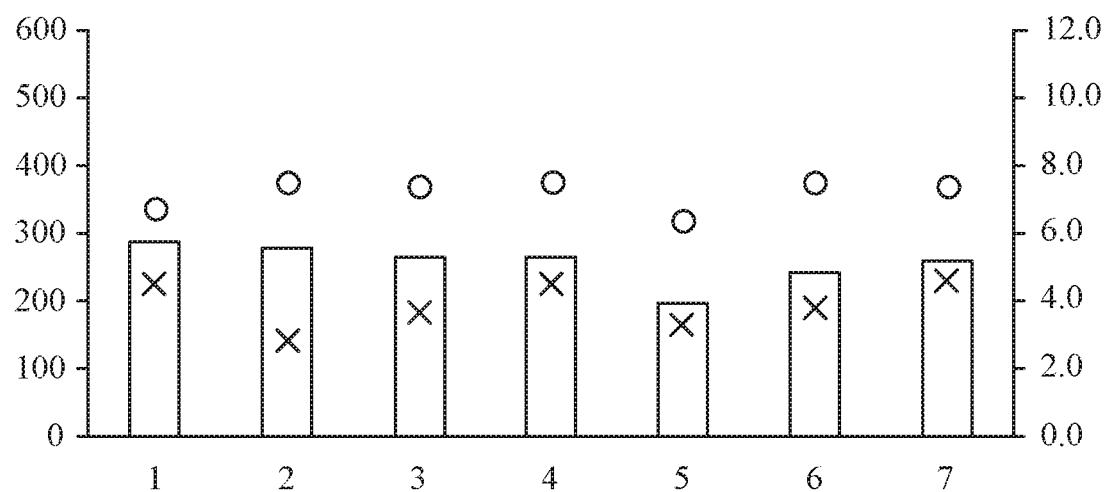
FIG. 16 depicts a graph of coach peel testing results for seven weld joints formed according to practices of the present disclosure in which the steel coupon included an electrode receiving wall and one or more integrated elevated portions of the steel coupon disposed at least partially around the electrode receiving wall. In this graph, as before with FIG. 15, the left y-axis represents coach peel strength in Newtons (N) and the right y-axis represents both the energy needed to break the coupons apart in Joules (J) and the diameter of a weld button (if any). Additionally, the coach peel strength of each weld joint is identified by a circle, the energy needed to break the coupons apart is identified by an "X," and the height of any rectangular bar constitutes the average diameter of a weld button, if present. The absence of a rectangular bar for any particular weld joint means that a weld button was not obtained.

Seven resistance spot weld joints were and formed between a 1.2 mm-galvanized low carbon steel coupon and a 1.2-mm AA6022-T4 aluminum coupon with local stiffening being incorporated into the steel coupons in accordance with the present disclosure. Specifically, while the aluminum coupons were planar, the steel coupons included a preformed round castellation similar to that shown in FIGS. 2-3 and a surrounding integrated elevated portion of the steel coupon to impart localized stiffening at the weld location. Each of the seven weld joints was formed in the same way as the other weld joints where no localized stiffening was utilized. After welding, the welded samples were baked in an oven at 175° C. to simulate ELPO bake exposure in a plant. This produced weld joints with a sound weld microstructure that were consistent between the two groups of joints (locally stiffened and not locally stiffened). The weld joints were then subjected to coach peel testing and the results plotted on the graph shown in FIG. 16. In that graph, as before, the coach peel strength of each weld joint, reported in Newtons (N) (left y-axis), is identified by a circle, and the energy needed to break the coupons apart, reported in Joules (J) (right y-axis), is identified by an "X." Additionally, the height of any rectangular bar constitutes the average diameter of a weld button, if present, and is reported in millimeters (mm) (also the right y-axis). The absence of a rectangular bar for any particular weld joint means that a weld button was not obtained.

The seven spot weld joints that were subjected to coach peel testing with the benefit of localized stiffening of the steel workpiece in accordance with the present disclosure included round castellations in which the electrode-contact surface was fully enclosed by a continuous integral elevated portion. The seven spot welds had an observed average peel strength of 363 N and an observed average energy to break of 3.94 J. Compared to the results in FIG. 15, the peel strength of the weld joints reported in FIG. 16 nearly doubled and the energy to break increased nearly eight-fold. Moreover, all of the weld joints in which localized stiffening was used produced a weld button, meaning that the weld joint was strong enough to tear a piece of the aluminum out of the aluminum coupon during testing. The observed average diameter of the seven weld buttons was 5.2 mm, which is approximately 2.5 times greater than the two weld buttons that were observed in the coach peel testing of the weld joints where localized stiffening of the steel coupons was not utilized. From these results, it can be concluded that the round castellation and the surrounding integral elevated portion incorporated into the steel coupon at the weld location was a primary contributor to the improved mechanical properties of the weld joints. The same type of results would be expected if any of the other constructions of the electrode receiving wall and the one or more integral elevated portions described above, as well as others not explicitly described, were substituted for the round castellation and its surrounding integrated elevated portion of the steel coupon The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

What is claimed is:

1. A method of resistance spot welding a workpiece stack-up that includes a steel workpiece and at least one adjacent overlapping aluminum workpiece, the method comprising:
    forming an electrode receiving wall in a steel workpiece, the electrode receiving wall having an electrode-contact surface and an opposed interface contact surface, the electrode-contact surface being at least partially defined by one or more integral elevated portions of the steel workpiece that protrude upwardly from the electrode-contact surface;
    assembling the steel workpiece and one or more aluminum workpieces in overlapping fashion to form a workpiece stack-up such that the interface contact surface of the electrode receiving wall of the steel workpiece confronts and makes contact with an adjacent faying surface of the one or more aluminum workpieces to establish a faying interface;
    pressing a first weld face of a first welding electrode against the electrode-contact surface of the electrode receiving wall of the steel workpiece at a first side of the workpiece stack-up;
    pressing a second weld face of a second welding electrode against an exposed back surface of the one or more aluminum workpieces at a second side of the workpiece stack-up in facial alignment with the first weld face of the first welding electrode;
    passing an electric current between the first weld face of the first welding electrode and the second weld face of the second welding electrode to create a molten aluminum weld pool within the one or more aluminum workpieces that wets the interface contact surface of the electrode receiving wall of the steel workpieces; and
    allowing the molten aluminum weld pool to solidify into a weld joint that bonds the one or more aluminum workpieces to the steel workpiece.

2. The method set forth in claim 1, wherein each of the one or more integral elevated portions of the steel workpiece that at least partially defines the electrode-contact surface of the electrode receiving wall is raised at least 0.5 mm above the electrode-contact surface.

3. The method set forth in claim 1, wherein a segment of a faying surface of the steel workpiece underneath the one or more integral elevated portions of the steel workpiece confronts, but does not contact, the adjacent faying surface of the one or more aluminum workpieces, thereby defining a gap in combination with the adjacent faying surface of the one or more aluminum workpieces that at least partially surrounds the electrode receiving wall of the steel workpiece.

4. The method set forth in claim 1, wherein the electrode-contact surface of the electrode receiving wall is fully enclosed by the one or more integrated elevated portions of the steel workpiece.

5. The method set forth in claim 1, wherein the electrode-contact surface of the electrode receiving wall is partially enclosed by the one or more integrated elevated portions of the steel workpiece.

6. The method set forth in claim 1, wherein the electrode receiving wall is a round castellation in which the electrode-contact surface is round or ovular in plan view and is at least partially circumscribed by an inclined wall that extends outwardly from the electrode-contact surface at an obtuse angle ranging from 95° to 150°.

7. The method set forth in claim 1, wherein the electrode receiving wall is a linear castellation in which the electrode-contact surface is rectangular in plan view and is defined at least partially by a pair of lateral integral elevated portions of the steel workpiece, each of the lateral integral elevated portions of the steel workpiece having an inclined wall that extends outwardly from the electrode-contact surface at an obtuse angle ranging from 95° to 150°.

8. The method set forth in claim 1, wherein the electrode receiving wall is a portion of the steel workpiece located between two spaced apart strengthening ribs, each of the strengthening ribs including an arcuate wall having an outer surface that protrudes outwardly from the electrode-contact surface and an outboard portion of a back surface of the steel workpiece outside of the electrode receiving wall.

9. The method set forth in claim 1, wherein the steel workpiece has a thickness of 2.5 mm or less and a yield strength of 250 MPa or less, or wherein the steel workpiece has a thickness of 1.8 mm or more and a yield strength of 500 MPa or less.

10. The method set forth in claim 1, wherein the steel workpiece has a thickness of 1.3 mm or less and a yield strength of 1000 MPa or less, or wherein the steel workpiece has a thickness of 0.6 mm or less and a yield strength of 1000 MPa or less.

11. A method of resistance spot welding a workpiece stack-up that includes a steel workpiece and at least one adjacent overlapping aluminum workpiece, the method comprising:
    providing a workpiece stack-up that includes a steel workpiece which overlaps one or more aluminum workpieces at a spot weld location, the steel workpiece comprising an electrode receiving wall having an electrode-contact surface and an opposed interface contact surface, the electrode-contact surface being at least partially defined by one or more integral elevated portions of the steel workpiece that protrude outwardly from the electrode-contact surface, and the interface contact surface of the electrode receiving wall of the steel workpiece confronting and making contact with an adjacent faying surface of the one or more aluminum workpieces to establish a faying interface, wherein at least some part of the one or more integral elevated portions of the steel workpiece are located within a planar circular region that extends in a plane of the electrode-contact surface and has a radius of 5 mm to 50 mm as measured from a center of the spot weld location, and wherein anywhere from 90° to 360° of a circumference of the planar circular region is spanned by the one or more integral elevated portions of the steel workpiece;

pressing a first weld face of a first welding electrode against the electrode-contact surface of the electrode receiving wall of the steel workpiece at a first side of the workpiece stack-up;

pressing a second weld face of a second welding electrode against an exposed back surface of the one or more aluminum workpieces at a second side of the workpiece stack-up in facial alignment with the first weld face of the first welding electrode;

passing an electric current between the first weld face of the first welding electrode and the second weld face of the second welding electrode to create a molten aluminum weld pool within the one or more aluminum workpieces that wets the interface contact surface of the electrode receiving wall of the steel workpiece; and allowing the molten aluminum weld pool to solidify into a weld joint that bonds the one or more aluminum workpieces to the steel workpiece, the weld joint extending into the one or more aluminum workpieces included in the workpiece stack-up and establishing a bonding interface with the interface contact surface of the electrode receiving wall of the steel workpiece, the weld joint including an aluminum weld nugget and a Fe—Al intermetallic layer between the aluminum weld nugget and the interface contact surface of the electrode receiving wall of the steel workpiece.

12. The method set forth in claim 11, wherein providing the workpiece stack-up comprises:

forming the electrode receiving wall and the one or more integral elevated portions that are disposed at least partially around the electrode receiving wall in the steel workpiece; and assembling the steel workpiece and the one or more aluminum workpieces in overlapping fashion to form the workpiece stack-up such that the interface contact surface of the electrode receiving wall of the steel workpiece confronts and makes contact with the adjacent faying surface of the one or more aluminum workpieces to establish the faying interface.

13. The method set forth in claim 11, wherein forming the electrode receiving wall in the steel workpiece comprises stamping the electrode receiving wall to form (1) a round castellation in which the electrode-contact surface is round or ovular in plan view and is at least partially circumscribed by an inclined wall that extends outwardly from the electrode-contact surface at an obtuse angle, or (2) a linear castellation in which the electrode-contact surface is rectangular in plan view and is defined at least partially by a pair of lateral integral elevated portions of the steel workpiece, each of the lateral integral elevated portions of the steel workpiece having an inclined wall that extends outwardly from the electrode-contact surface at an obtuse angle.

14. The method set forth in claim 11, wherein the electrode-contact surface of the electrode receiving wall is fully enclosed by the one or more integrated elevated portions of the steel workpiece.

15. The method set forth in claim 11, wherein the electrode-contact surface of the electrode receiving wall is partially enclosed by the one or more integrated elevated portions of the steel workpiece.

16. The method set forth in claim 11, wherein a segment of a faying surface of the steel workpiece underneath the one or more integral elevated portions of the steel workpiece confronts, but does not contact, the adjacent faying surface of the one or more aluminum workpieces, thereby defining a gap in combination with the adjacent faying surface of the one or more aluminum workpieces that at least partially surrounds the electrode receiving wall of the steel workpiece.

17. The method set forth in claim 11, wherein the steel workpiece has a thickness of 2.5 mm or less and a yield strength of 250 MPa or less, or wherein the steel workpiece has a thickness of 1.8 mm or more and a yield strength of 500 MPa or less.

18. The method set forth in claim 11, wherein the steel workpiece has a thickness of 1.3 mm or less and a yield strength of 1000 MPa or less, or wherein the steel workpiece has a thickness of 0.6 mm or less and a yield strength of 1000 MPa or less.

* * * * *